US008994955B2

(12) United States Patent
Tanemura et al.

(10) Patent No.: US 8,994,955 B2
(45) Date of Patent: Mar. 31, 2015

(54) FABRY-PEROT INTERFEROMETER

(71) Applicant: DENSO CORPORATION, Kariya, Aichi (JP)

(72) Inventors: Tomoki Tanemura, Obu (JP); Shuichi Yamashita, Okazaki (JP); Hiroyuki Wado, Toyota (JP); Yukihiro Takeuchi, Miyoshi (JP)

(73) Assignee: DENSO CORPORATION, Kariya (JP)

( * ) Notice: Subject to any disclaimer, the term of this patent is extended or adjusted under 35 U.S.C. 154(b) by 122 days.

(21) Appl. No.: 13/915,830

(22) Filed: Jun. 12, 2013

(65) Prior Publication Data
US 2013/0335748 A1      Dec. 19, 2013

(30) Foreign Application Priority Data

Jun. 18, 2012   (JP) ................................. 2012-137237

(51) Int. Cl.
*G01B 9/02*        (2006.01)
*G02B 1/10*        (2006.01)

(52) U.S. Cl.
CPC .............. *G01B 9/02* (2013.01); *G01B 9/02023* (2013.01)
USPC ......................................... 356/519; 359/586

(58) Field of Classification Search
CPC ... G01B 9/02023; G01B 2290/25; G01J 3/26; G02B 5/281; G02B 5/284; G02B 26/001
USPC .................. 356/454, 519; 359/586
See application file for complete search history.

(56) References Cited

U.S. PATENT DOCUMENTS

| | | | |
|---|---|---|---|
| 7,733,495 B2 | 6/2010 | Suzuki et al. | |
| 2004/0218865 A1* | 11/2004 | Lu | ................................... 385/39 |
| 2012/0050751 A1* | 3/2012 | Blomberg | ...................... 356/519 |
| 2012/0127482 A1* | 5/2012 | Tanemura et al. | ............. 356/519 |

FOREIGN PATENT DOCUMENTS

| | | |
|---|---|---|
| JP | 2006-258992 A | 9/2006 |
| JP | 2011-028119 A | 2/2011 |
| JP | 2011-128516 A | 6/2011 |

OTHER PUBLICATIONS

Office Action mailed Nov. 25, 2014 issued in corresponding JP patent application No. 2012-137237 (and English translation).

(Continued)

*Primary Examiner* — Michael A Lyons
(74) *Attorney, Agent, or Firm* — Posz Law Group, PLC

(57) ABSTRACT

A Fabry-Perot interferometer includes an input mirror and an output mirror arranged facing the input mirror via a gap. Each mirror includes a pair of high-refractive layers and a space layer arranged selectively between the high-refractive layers. At least one of an input-side bridge part and an output-side bridge part arranged crossing the gap, is movable as a membrane. Each bridge part includes a transmission portion and a periphery portion. Each transmission portions includes a mirror element in which the space layer is sandwiched by the pair of high-refractive layers. In a second direction perpendicular to the first direction, the mirror element of the input mirror has a width larger than seven times of a maximum wavelength of a transmission light output from the output mirror, and functions as a diffraction restriction mirror.

9 Claims, 14 Drawing Sheets

(56) References Cited

OTHER PUBLICATIONS

Office Action mailed May 13, 2014 issued in corresponding JP patent application No. 2012-137237 (and English translation).

Tetsuya Enomoto et al., Infrared Absorption Sensor for Multiple Gas Sensing, IEEJ Transactions on Sensors and Micromachines, vol. 131 No. 7, Jul. 1, 2011, pp. 264-269 (and partial English translation).

* cited by examiner

FABRY-PEROT INTERFEROMETER

CROSS REFERENCE TO RELATED APPLICATION

This application is based on Japanese Patent Application No. 2012-137237 filed on Jun. 18, 2012, the disclosure of which is incorporated herein by reference.

TECHNICAL FIELD

The present disclosure relates to a Fabry-Perot interferometer.

BACKGROUND

JP 2008-134388 A (corresponding to U.S. Pat. No. 7,733,495 B2) discloses a Fabry-Perot interferometer. The Fabry-Perot interferometer includes a pair of mirrors. Each mirror includes a pair of high-refractive layers each of which having a high refractive index and a low-refractive layer having a low refractive index. The pair of high-refractive layers is provided by semiconducting films made of silicon, germanium or the like. The low-refractive layer, which actually is a space layer, is selectively arranged between the pair of high-refractive layers. The pair of mirrors arranged facing each other via an air gap. Each mirror includes a bridge part that crosses the air gap. One of the bridge parts of the mirrors provides a membrane, which is movable. The bridge part includes a transmission portion in which the low-refractive layer is sandwiched by the pair of high-refractive layers and a periphery portion arranged around the transmission portion. The transmission portion at least includes one mirror element in which the low-refractive layer is sandwiched by the pair of high-refractive layers. The pair of transmission portions, respectively, included in the pair of bridge parts are arranged facing each other.

In the above Fabry-Perot interferometer, the mirror includes optical multiple layers including the space layer. With this configuration, a wide high-reflectance band is provided and, accordingly, a wide spectroscopy band is provided. However, a mechanical strength of each mirror having the space layer is low. Thus, a warpage may occur on the high-refractive layer arranged on the space layer. In order to secure the mechanical strength, a ratio of the space layer to the transmission portion may be reduced. That is, a width of the mirror element may be reduced.

Absorption wavelengths of normal gas and normal liquid, such as gasoline, water, alcohol, for example, ethanol, acetic acid, carbon dioxide, carbon monoxide, nitrogen oxide (NOx), sulfur dioxide are within a range of 2 micrometers ($\mu m$) to 10 $\mu m$, which is approximately equal to a mid-wavelength infrared range. Thus, the above-described Fabry-Perot interferometer may be used in an infrared light detector or may configure an infrared light absorption sensor together with an infrared light source. The infrared light detector and the infrared light absorption sensor may be used to detect compositions and concentration of a gas or a liquid.

However, when the width of the mirror element is reduced in order to improve the mechanical intensity, the mirror functions as a slit within the mid-wavelength infrared range and a diffraction occurs to a transmission light passing through the mirror. When the diffraction occurs, not only a rectilinear propagation light but also a diffraction light, which is slanted by the diffraction, resonate by the mirrors. When passing through the gap, an optical path length of the rectilinear propagation light is different from an optical path length of the diffraction light. Thus, a full width at half maximum (FWHM) of the transmission light, which passes through the Fabry-Perot interferometer, is increased. That is, a resolution of the infrared light absorption sensor to differentiate compositions is reduced. This conclusion is found by inventors of the present disclosure.

SUMMARY

In view of the foregoing difficulties, it is an object of the present disclosure to provide a Fabry-Perot interferometer, which is appropriate to detect compositions of a gas or a liquid having a wavelength within a mid-wavelength infrared range.

According to an aspect of the present disclosure, a Fabry-Perot interferometer includes an input mirror arranged at an input side of a light, and an output mirror arranged at an output side of the light. The output mirror faces the input mirror in a first direction via a gap. Each of the input mirror and the output mirror includes a pair of high-refractive layers and a space layer arranged selectively between the pair of high-refractive layers. Each of the pair of high-refractive layers has a refractive index larger than a refractive index of the space layer. In the input mirror, the pair of high-refractive layers and the space layer provide an input-side bridge part that crosses the gap defined between the input mirror and the output mirror. In the output mirror, the pair of high-refractive layers and the space layer provide an output-side bridge part that crosses the gap defined between the input mirror and the output mirror. At least one of the input-side bridge part and the output-side bridge part is movable in the first direction as a membrane. Each of the input-side bridge part and the output-side bridge part includes a transmission portion and a periphery portion arranged around the transmission portion. Each of the transmission portions includes a mirror element in which the space layer is sandwiched by the pair of high-refractive layers. The transmission portion of the input mirror is arranged facing the transmission portion of the output mirror. The light output from the output mirror is referred to as a transmission light. In a second direction perpendicular to the first direction, the mirror element of the input mirror has a width larger than seven times of a maximum wavelength of the transmission light, and functions as a diffraction restriction mirror.

In the above Fabry-Perot interferometer, the width of the mirror element of the input mirror is set larger than the width of the mirror element of the output mirror. Thus, an increase of the FWHM of the transmission light, which is caused by the diffraction, is restricted.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
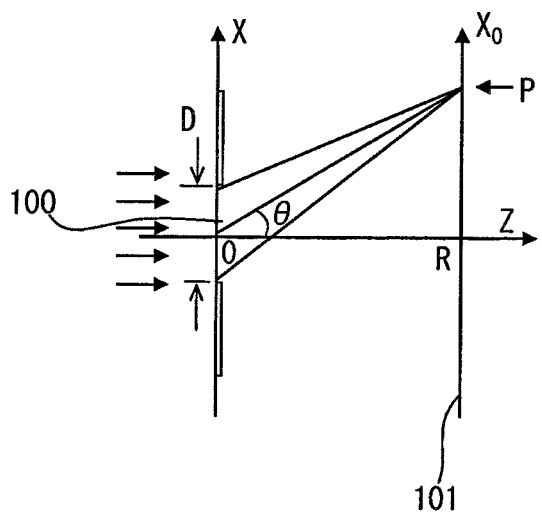
FIG. 1 is a diagram showing a single slit diffraction.

The following will describe embodiments of the present disclosure with reference to the drawings. In each of the following embodiments, the same reference number is added to the same or equivalent parts in the drawings. Hereinafter, a direction in which a pair of mirrors facing each other is referred to as a first direction. The pair of mirrors is arranged via an air gap, which is referred to as gap hereinafter. Further, a direction along a plane that is perpendicular to the first direction is referred to as a second direction, and a length of a mirror element in the second direction is referred to as a width of the mirror element or a mirror element width.

Before describing the embodiments of the present disclosure, a development to create the present disclosure will be described.

The applicant of the present disclosure proposed variety of improvements for a Fabry-Perot interferometer disclosed in JP 2008-134388 A. The Fabry-Perot interferometer disclosed in JP 2008-134388 A includes a pair of mirrors arranged facing each other via a gap. Each mirror includes a pair of high-refractive layers made of, such as polysilicon, and a low-refractive layer selectively arranged between the pair of high-refractive layers. The low-refractive layer is actually provided by a space layer. In the above Fabry-Perot interferometer, each mirror includes a bridge part that crosses the gap. At least one of the bridge parts functions as a membrane, which is movable in the first direction. The bridge part includes a transmission portion in which the low-refractive layer is sandwiched by the pair of high-refractive layers and a periphery portion arranged around the transmission portion. In the periphery portion, the pair of high-refractive layers is contacted with each other without the low-refractive layer. The transmission portion includes at least one mirror element in which the low-refractive layer is sandwiched by the pair of high-refractive layers. The pair of transmission portions, respectively, included in the pair of bridge parts are arranged facing each other.

The Fabry-Perot interferometer having has a low mechanical strength due to the space layer include in the mirror. In order to secure the mechanical strength, a ratio of the space layer to the transmission portion may be reduced. The transmission portion includes at least one mirror element that selectively transmits the infrared lights. That is, a width of the mirror element is reduced in order to secure a mechanical strength. When the width of the mirror is reduced, diffraction of light easily occurs within the mid-wavelength infrared range (2 μm to 10 μm). As well known, absorption wavelengths of normal gas and normal liquid, such as gasoline, water, alcohol, for example, ethanol, acetic acid, carbon dioxide, carbon monoxide, nitrogen oxide (NOx), sulfur dioxide are within the mid-wavelength infrared range (2 μm to 10 μm).

Regarding the above-described difficulty, the inventors of the present disclosure studied on an effect of the diffraction on light amount of the transmission light passing through the Fabry-Perot interferometer by simulations. FIG. 1 shows a diffraction of a light when the light passes through a single slit 100. Hereinafter, the infrared light is also referred to as light for convenience. The single slit 100 corresponds to one of the mirrors of the Fabry-Perot interferometer arranged on an incidence side. A screen 101 arranged apart from the single slit 100 by a distance R in a z-direction corresponds to an infrared light detector. The single slit 100 has a width of D. That is, the mirror element has a width of D.

Figure 2:
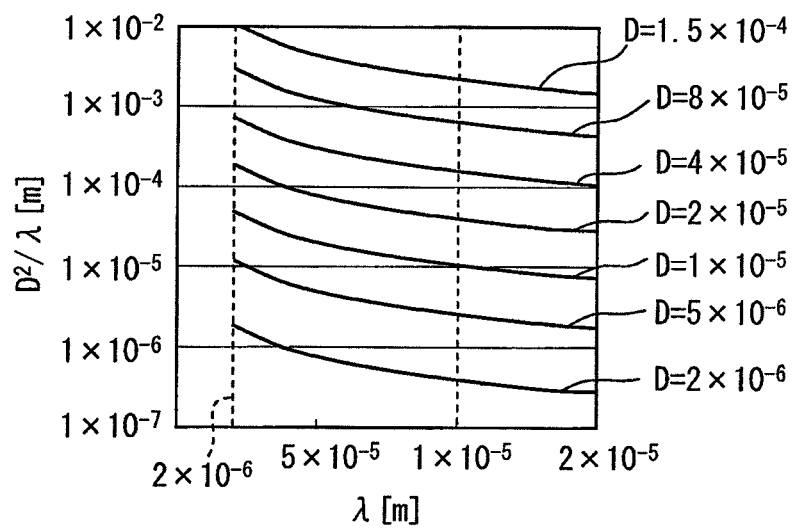
FIG. 2 is a diagram showing a relationship between a wavelength $\lambda$ of an incident light and a parameter $D^2/\lambda$ for each mirror element width D.

When $R<D^2/\lambda$, that is in a range where the distance R is smaller than the mirror element width D and larger than the wavelength $\lambda$, a Fresnel diffraction occurs. When $R>D^2/\lambda$, that is in a range where the distance R is larger than the mirror element width D and smaller than the wavelength $\lambda$, a Fraunhofer diffraction occurs. FIG. 2 shows a relationship between the wavelength $\lambda$ of an incident light and a parameter $D^2/\lambda$ for each mirror element width D. In FIG. 2, a unit of the mirror element width D is meter (m). That is, the value $1\times10^{-2}$ of the mirror element width D indicates 10 millimeters (mm). The above-described Fabry-Perot interferometer is manufactured by a micro electro mechanical systems (MEMS) technology. In order to secure a mechanical strength, a maximum value of the mirror element width D is approximately 150 μm. Accordingly, as shown in FIG. 2, within the mid-wavelength infrared range of 2 μm to 10 μm, the parameter $D^2/\lambda$ is smaller than $1\times10^{-2}$ m ($D^2/\lambda<1\times10^{-2}$ m).

Figure 3:
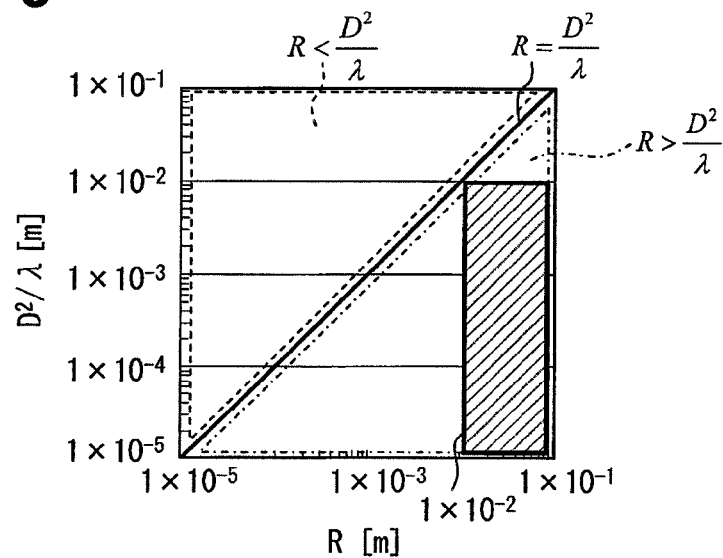
FIG. 3 is a diagram showing a Fresnel diffraction range and a Fraunhofer diffraction range.

FIG. 3 shows a range of the Fresnel diffraction and a range of the Fraunhofer diffraction. In the above-described Fabry-Perot interferometer, the distance R from the mirror, which is arranged at the incidence side, to the infrared light detector is normally set equal to or larger than 10 mm considering a mounting of the Fabry-Perot interferometer and the infrared light detector. In FIG. 3, a region that satisfies the distance R is equal to or larger than 10 mm and the parameter $D^2/\lambda$ is smaller than 10 mm is shown by hatched lines. Thus, Fraunhofer diffraction is taken into consideration.

In the Fraunhofer diffraction, an amplitude $u_p$ of the diffraction light is calculated by expression 1 showing below. Further, light energy I is calculated by expression 2 showing below. The light energy I indicates amount of the lights. In expression 1, A' is a related constant. The related constant A' is related to an amplitude, a wavelength of an incident light, and a detection distance. Further, in expression 1, k indicates a wave number, $x_0$ indicates a position of a point P along $X_0$ direction in FIG. 1.

$$u_p = A'D\frac{\sin\frac{kD}{2R}x_0}{\frac{kD}{2R}x_0} \qquad \text{Expression 1}$$

$$I = u_p^2 \qquad \text{Expression 2}$$

Further, a diffraction angle $\theta$ in FIG. 1 is calculated by expression 3 showing below. In order to differentiate with other angles, which will be described later, the diffraction angle $\theta$ is also referred to as $\theta d$.

$$\theta = \tan^{-1}\frac{x_0}{R} \qquad \text{Expression 3}$$

Figure 4:
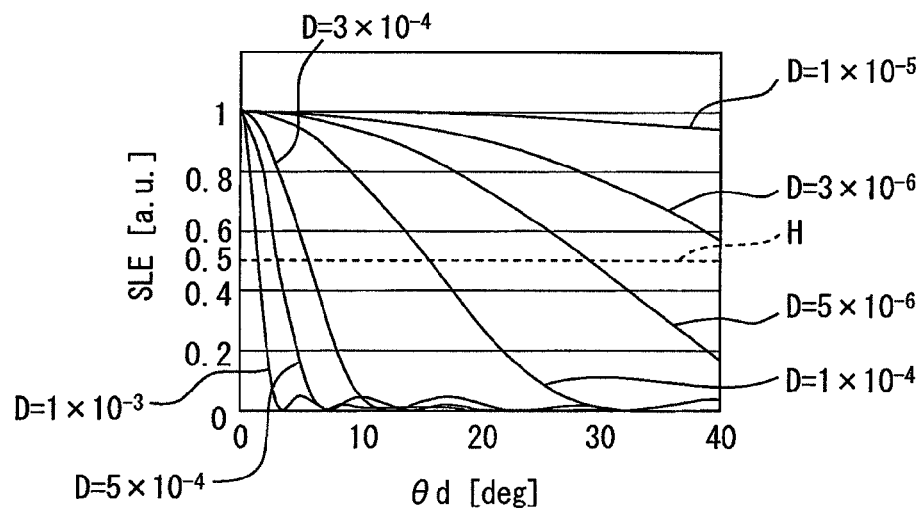
FIG. 4 is a diagram showing a relationship between a diffraction angle $\theta d$ and a standardized light energy SLE for each mirror element width D when an incident light has a wavelength $\lambda$ of 10 micrometers ($\mu m$)

FIG. 4 shows a relationship between the diffraction angle $\theta d$ and a standardized light energy (SLE) of the diffraction light. The standardized light energy has an arbitrary unit (a. u.). The standardized light energy of the diffraction light is standardized with the light energy of the rectilinear propagation light as one. In FIG. 4, the relationship between the diffraction angle $\theta d$ and the standardized light energy of the diffraction light is based on the wavelength $\lambda$ of the incident light is equal to 10 μm and the distance R from the mirror to the detector is equal to 10 mm ($\lambda=10$ μm, R=10 m). As shown in FIG. 4, when the mirror element width D decreases, a ratio of the diffraction lights having relatively large diffraction angles $\theta d$ to the whole transmission lights increases.

Figure 5:
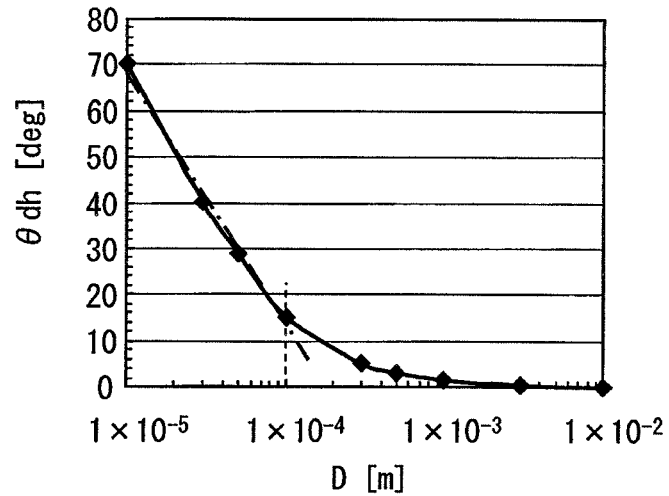
FIG. 5 is a diagram showing a relationship between a mirror element width D and a half value diffraction angle θdh when the incident light has the wavelength λ of 10 μm.

FIG. 5 shows a relationship between the mirror element width D and the diffraction angle $\theta d$ when the standardized light energy of the diffraction light is equal to half of the light energy of the rectilinear propagation light (shown by a dashed line H in FIG. 4). When the standardized light energy of the diffraction light is equal to half of the light energy of the rectilinear propagation light, the diffraction angle $\theta d$ is also referred to as a half value diffraction angle $\theta dh$. As shown in FIG. 5, when the mirror element width D is smaller than $1\times10^{-4}$ m, that is 100 μm, the half value diffraction angle $\theta dh$ sharply increases with a slight decrease in the mirror element width D. When the mirror element width D is equal to or larger than 100 μm to the wavelength $\lambda$ of 10 μm, that is the mirror element width D is equal to or larger than ten times of the wavelength $\lambda$ ($D>=10\lambda$), the half value diffraction angle $\theta dh$ is decreased.

Figure 6:
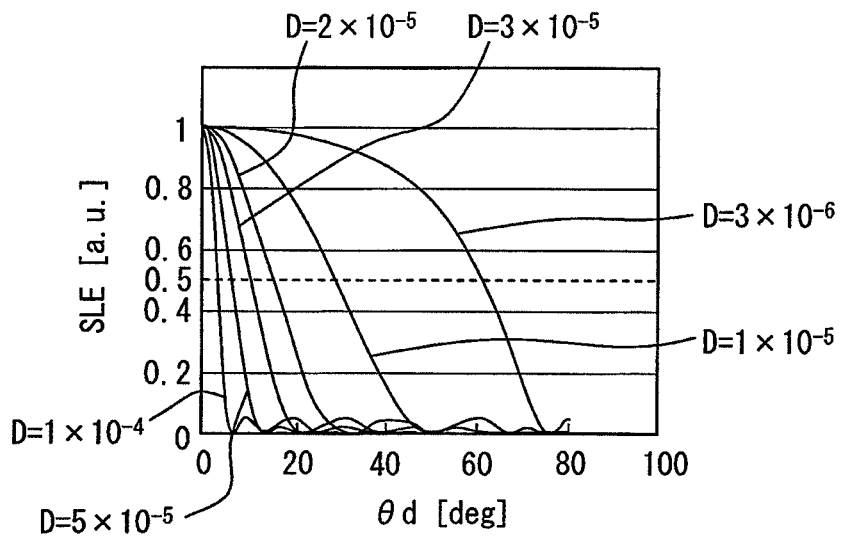
FIG. 6 is a diagram showing a relationship between a diffraction angle θd and a standardized light energy SLE for each mirror element width D when an incident light has a wavelength λ of 2 μm.
Figure 7:
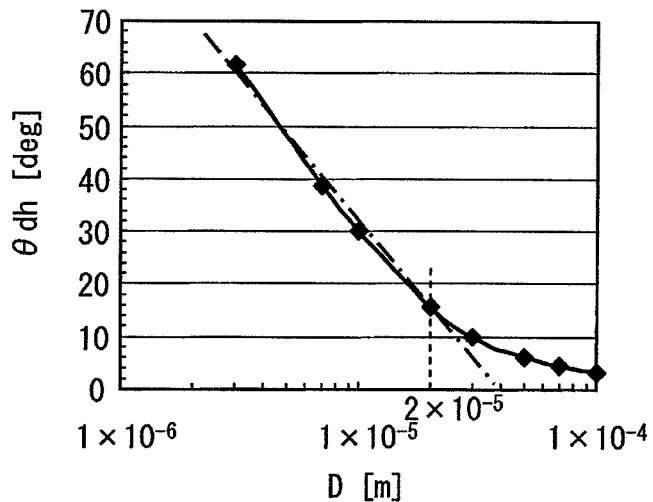
FIG. 7 is a diagram showing a relationship between a mirror element width D and a half value diffraction angle θdh when the incident light has the wavelength λ of 2 μm.
Figure 8:
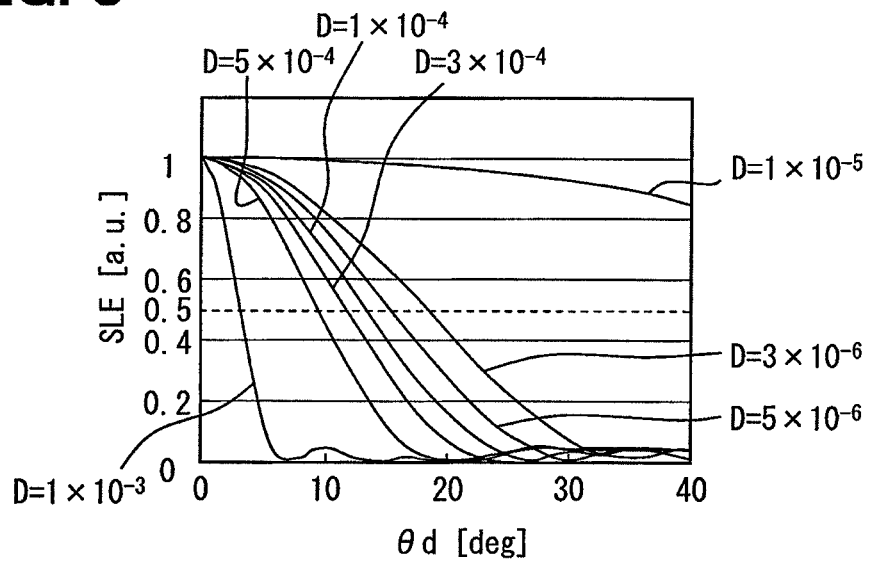
FIG. 8 is a diagram showing a relationship between a diffraction angle θd and a standardized light energy SLE for each mirror element width D when an incident light has a wavelength λ of 6 μm.
Figure 9:
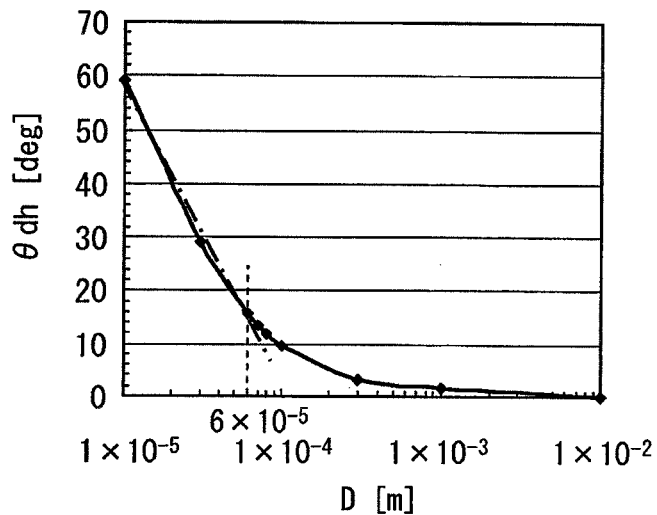
FIG. 9 is a diagram showing a relationship between a mirror element width D and a half value diffraction angle θdh when the incident light has the wavelength λ of 6 μm.

The inventors performed similar simulations to incident lights having different wavelengths within the mid-wavelength infrared range. FIG. 6 shows a relationship between the diffraction angle $\theta d$ and a standardized light energy (SLE) of the diffraction light when the wavelength $\lambda$ of the incident light is equal to 2 μm and the distance R is equal to 10 mm ($\lambda=2$ μm, R=10 mm). FIG. 7 is a diagram showing a relationship between the mirror element width D and the half value diffraction angle $\theta dh$ based on FIG. 6. FIG. 8 shows a relationship between the diffraction angle $\theta d$ and a standardized light energy (SLE) of the diffraction light when the wavelength $\lambda$ of the incident light is equal to 6 μm and the distance R is equal to 10 mm ($\lambda=2$ μm, R=10 mm). FIG. 9 is a diagram showing a relationship between the mirror element width D and the half value diffraction angle $\theta dh$ based on FIG. 8.

As shown in FIG. 6 and FIG. 8, when the mirror element width D decreases, a ratio of the diffraction lights having relatively large diffraction angles $\theta d$ to the whole transmission lights increases. As shown in FIG. 7, when the mirror element width D is smaller than $2\times10^{-5}$ m, that is 20 μm, the half value diffraction angle $\theta dh$ sharply increases with a slight decrease in the mirror element width D. Thus, when the mirror element width D is equal to or larger than 20 μm to the wavelength $\lambda$ of 2 μm, that is the mirror element width D is equal to or larger than ten times of the wavelength $\lambda$ ($D>=10\lambda$), the half value diffraction angle $\theta dh$ can be decreased. Similarly, as shown in FIG. 9, when the mirror element width D is smaller than $6\times10^{-5}$ m, that is 60 μm, the half value diffraction angle $\theta dh$ sharply increases with a slight decrease in the mirror element width D. Thus, when the mirror element width D is equal to or larger than 60 μm to the wavelength $\lambda$ of 6 μm, that is the mirror element width D is equal to or larger than ten times of the wavelength $\lambda$ ($D>=10\lambda$), the half value diffraction angle $\theta dh$ can be decreased.

As described above, the inventors of the present disclosure found that within the mid-wavelength infrared range (2 μm to 10 μm), when the mirror element width D is equal to or larger than ten times of the wavelength $\lambda$ ($D>=10\lambda$), the half value diffraction angle $\theta dh$ can be decreased. That is, the inventors obtained a first learning that the full width at half maximum (FWHM) of the transmission light can be decreased when the mirror element width D is equal to or larger than ten times of the wavelength $\lambda$ ($D>=10\lambda$).

Figure 10:
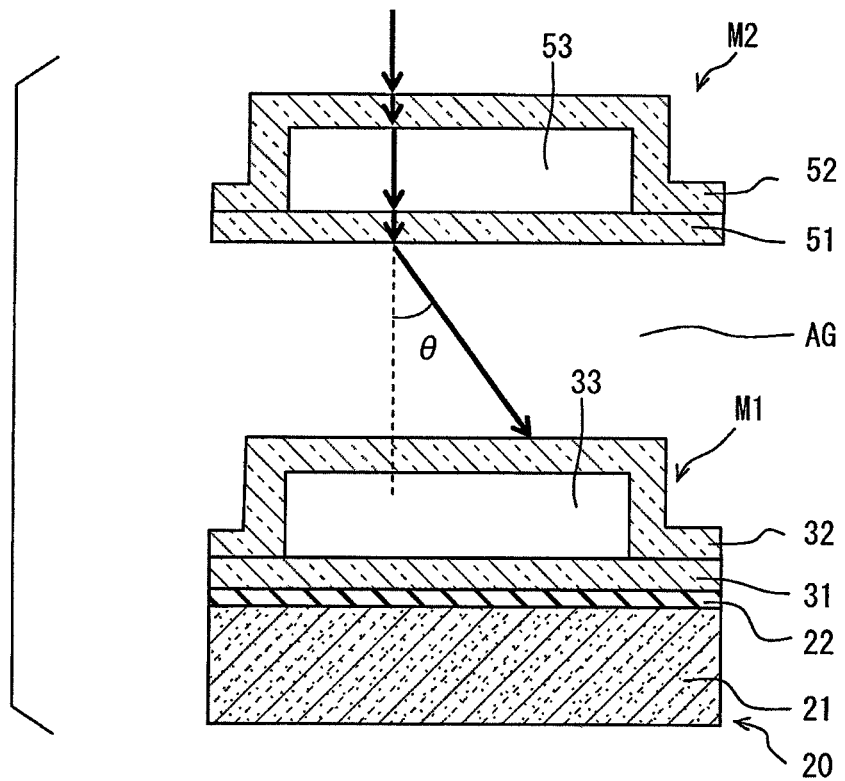
FIG. 10 is a diagram showing a diffraction occurred in the Fabry-Perot interferometer.

The inventors of the present disclosure further studied on an effect of the diffraction on a wavelength of the transmission light that passes through the mirror and an effect of the diffraction on a transmittance by simulations. FIG. 10 shows that an incident light enters the gap AG of the Fabry-Perot interferometer along the first direction. As shown in FIG. 10, the Fabry-Perot interferometer includes an input-side mirror element M1, an output-side mirror element M2, a pair of high-refractive layers 31, 32 included in the input-side mirror element M1, a space layer 33 included in the input-side mirror element M1, a pair of high-refractive layers 51, 52 included in the output-side mirror element M2, and a space layer 53 included in the output-side mirror element M2. Further, the input-side mirror element M1 and the output-side mirror element M2, which are paired with each other, are arranged via the gap AG. The Fabry-Perot interferometer further includes a substrate 20 that supports the output-side mirror element M1. The substrate 20 includes a semiconductor substrate 21 and an insulation film 22 arranged on the semiconductor substrate 21.

As shown in FIG. 10, in the Fabry-Perot interferometer, an incident light passes through the high-refractive layer 52, the space layer 53, and the high-refractive layer 51 in order along the first direction. The transmission light passes through the input-side mirror element M2, and enters the gap AG. A part of the transmission light diffracts at an angle of θ.

Figure 11:
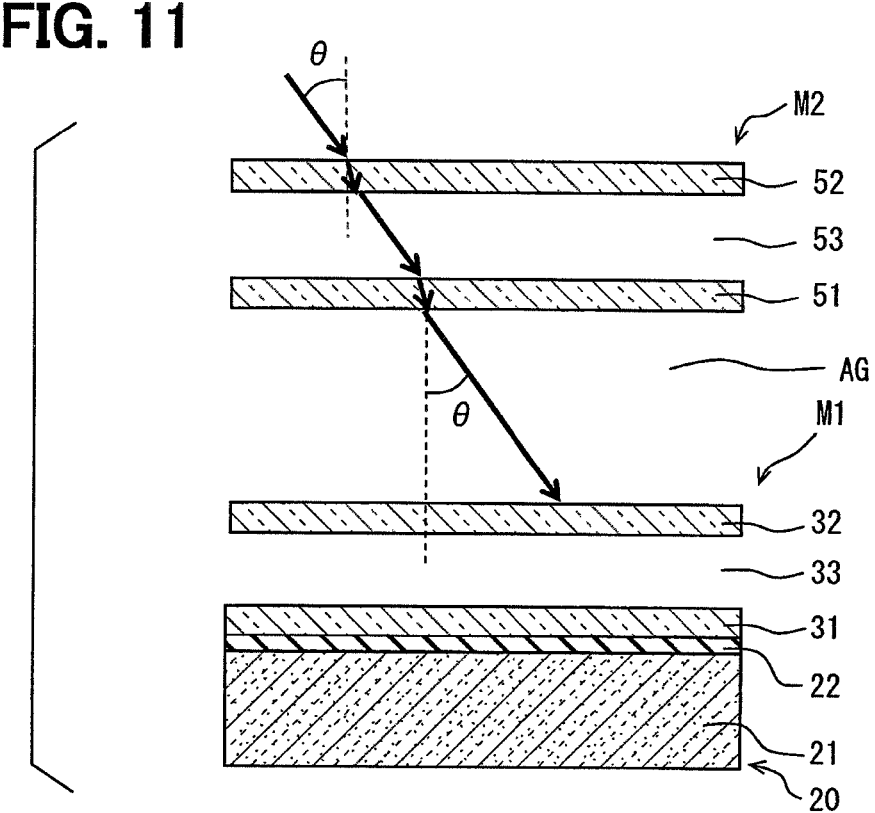
FIG. 11 is a diagram showing an analysis model of the diffraction occurred in the Fabry-Perot interferometer having multiple layers.

The diffraction occurred at a boundary surface between the high-refractive layer 51 and the gap AG is reproduced in FIG. 11 regarding multi layer analysis, and the effect of the diffraction on the wavelength of the transmission light and the transmittance are studied. Specifically, as shown in FIG. 11, the incident light having an incident angle of θi enters the high-refractive layer 52 of the input-side mirror element M2. The incident angle θi is set equal to the diffraction angle θd shown in FIG. 10. That is, the incident light is slanted with respect to the first direction and the second direction. The slanted incident light refracts when entering the high-refractive layer 52. Then, when the incident light enters the space layer 53, the angle between the incident light and the first direction returns to θ. Further, the incident light refracts again when entering the high-refractive layer 51. Then, when the incident light enters the gap AG, the angle between the incident light and the first direction returns to θ. Thus, performing transmission simulations to the incident light having incident angle θi, the effect of the diffraction on the wavelength of the transmission light and the effect of the diffraction on the transmittance can be known.

For example, when the incident light has a wavelength λ of 10 μm (λ=10 μm), parameters of the layers configuring the input-side mirror element M2, a parameter of the gap AG, and parameters of the layers configuring the output-side mirror element M1 are set as below. The high-refractive layer 52 is provided by a non-doped polysilicon having a thickness of 440 nanometers (nm), the space layer 53 has a thickness of 2040 nm, and the high-refractive layer 51 is provided by a non-doped polysilicon having a thickness of 440 nm. Further, the gap AG has a thickness of 5500 nm. The high-refractive layer 32 is provided by a non-doped polysilicon having a thickness of 440 nanometers (nm), the space layer 33 has a thickness of 2040 nm, and the high-refractive layer 31 is provided by a non-doped polysilicon having a thickness of 440 nm. Further, the insulation film 22 is provided by a silicon dioxide film having a thickness of 880 nm, and the semiconductor substrate 21 has a thickness of 400 μm.

Figure 12:
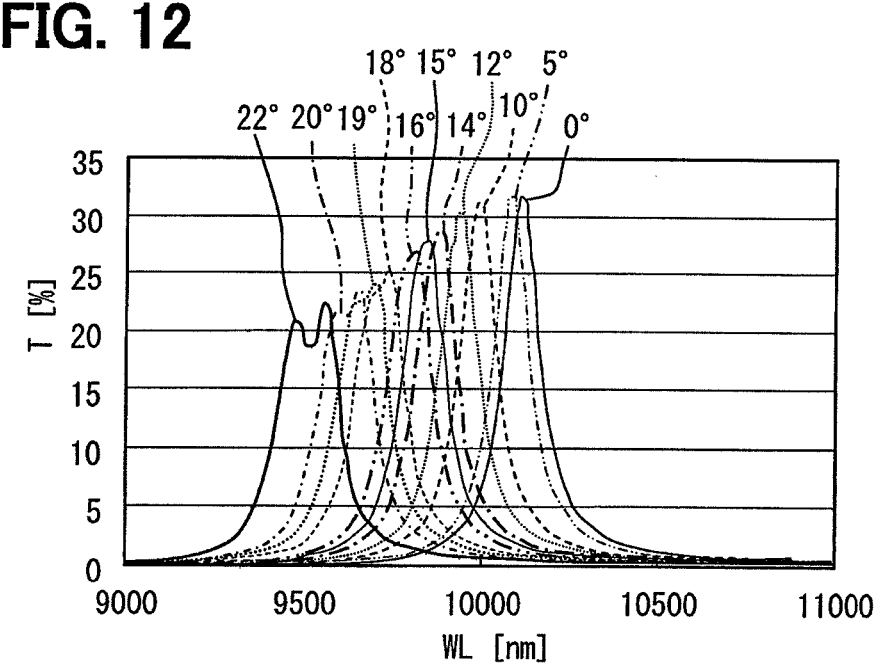
FIG. 12 is a diagram showing a relationship between a wavelength WL of a transmission light and a transmittance T for each incident angle when an incident light has a wavelength λ of 10 μm.

FIG. 12 shows a relationship between the wavelength (WL) of the transmission light and the transmittance (T) when the incident light has a wavelength of 10 μm. In this case, the incident light is slanted to the first direction and the second direction. As shown in FIG. 12, when the incident angle θi increases, the wavelength of the transmission light shifts to a short-wavelength side. The wave number k is calculated by expression 4 showing below. In expression 4, I indicates a wave number of a standing wave, n indicates a refractive index of the gap AG sandwiched by the pair of mirrors, d indicates a distance between the pair of mirrors, θ indicates the incident angle, which is equal to the diffraction angle.

$$k = \frac{\pi l}{nd \cos\theta} > \frac{\pi l}{nd} \qquad \text{Expression 4}$$

In expression 4, the wave number k increases with an increase in the incident angle θi. Further, the wavelength λ decreases with an increase in the wave number k. Thus, it is known from expression 4 that when the incident angle θi increases, the wavelength of the transmission light shifts to the short-wavelength side.

Further, when the incident angle θi, which is equal to the diffraction angle θd, is equal to or larger than 20 degrees, a width of the FWHM of the transmission light increases with an increase in the incident angle θi. However, when the incident angle θi is equal to or larger than 20 degrees, a split occurs to the transmission light. That is, multiple peaks of transmittance are confirmed at multiple wavelengths with respect to certain incident angle θi. A rise and fall of the transmittance is deemed as a peak of the transmittance. Specifically, split is not occurred to the transmission light having the incident angle θi of 0 degree, 5 degrees, 10 degrees, 12 degrees, 14 degrees, 15 degrees, 16 degrees, 18 degrees, or 19 degrees. Further, split is occurred to the transmission light having the incident angle θi of 20 degrees or 22 degrees. As shown in FIG. 5, in a case where the wavelength of the incident light is equal to 10 μm (λ=10 μm), the diffraction angle θd (half value diffraction angle θdh) is smaller than 20 degrees when the mirror element width D is larger than 70 μm. That is, it is known that when the mirror element width D is larger than seven times of the wavelength λ (D>7λ), the split is restricted and the increase in the FWHM is restricted.

Figure 13:
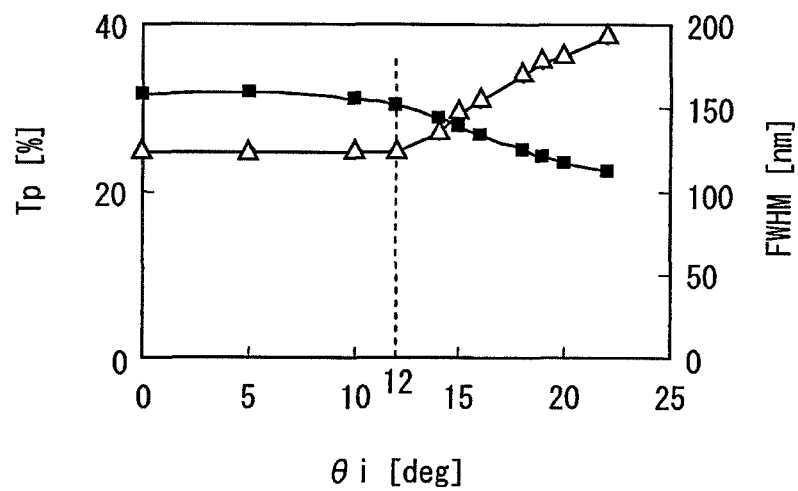
FIG. 13 is a diagram showing a relationship among an incident angle θi, a peak transmittance Tp, and a FWHM when the incident light has the wavelength λ of 10 μm.

Further, FIG. 13 shows a relationship among the incident angle θi, a peak transmittance (Tp) for each incident angle θi, and the FWHM of the transmission light when the incident light has the wavelength λ of 10 μm based on FIG. 12. In FIG. 13, a line connected by solid squares indicates the peak transmittance for each incident angle θi, and a line connected by hollow triangles indicates the FWHM of the transmission light. As shown in FIG. 13, when the incident angle θi is equal to or smaller than 12 degrees, the peak transmittance is maintained around 32% and the FWHM is maintained around 125 nm. Further, when the incident angle θi is larger than 12 degrees, the peak transmittance sharply decreases and the FWHM sharply increases with an increase in the incident angle θi. As shown in FIG. 5, in a case where λ=10 μm, when the mirror element width D is larger than 50 μm, the diffraction angle θd (half value diffraction angle θdh) becomes smaller than 12 degrees. That is, it is known that when the mirror element width D is equal to or larger than fifteen times of the wavelength λ (D>=15λ), the peak transmittance is maintained at a high level and the FWHM is further reduced.

Figure 14:
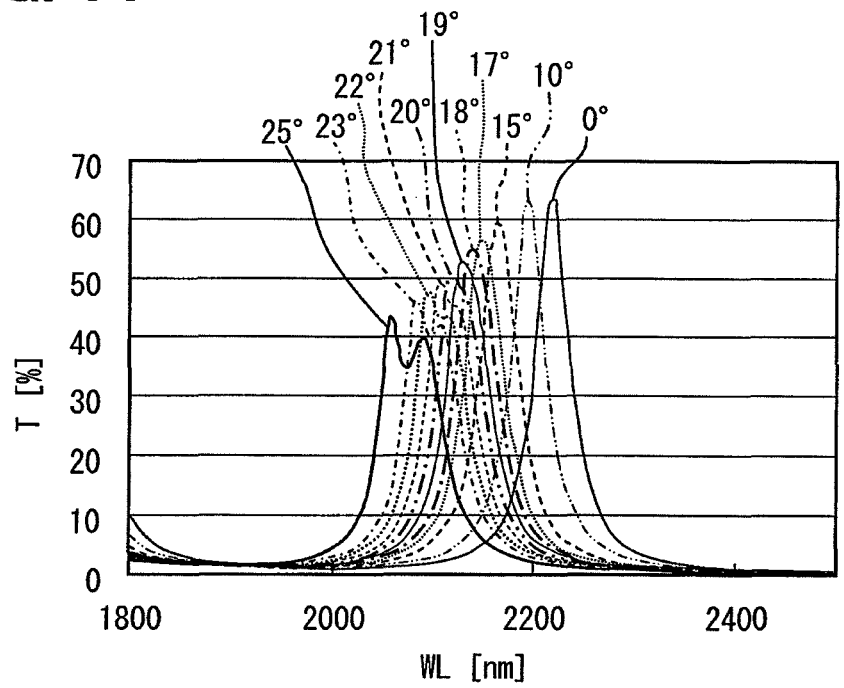
FIG. 14 is a diagram showing a relationship between a wavelength WL of a transmission light and a transmittance T for each incident angle when an incident light has a wavelength λ of 2 μm.
Figure 15:
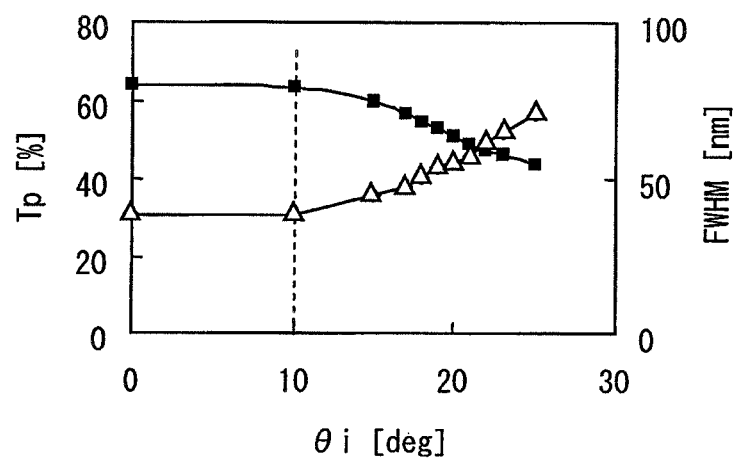
FIG. 15 is a diagram showing a relationship among an incident angle θi, a peak transmittance Tp, and a FWHM when the incident light has the wavelength λ of 2 μm.
Figure 16:
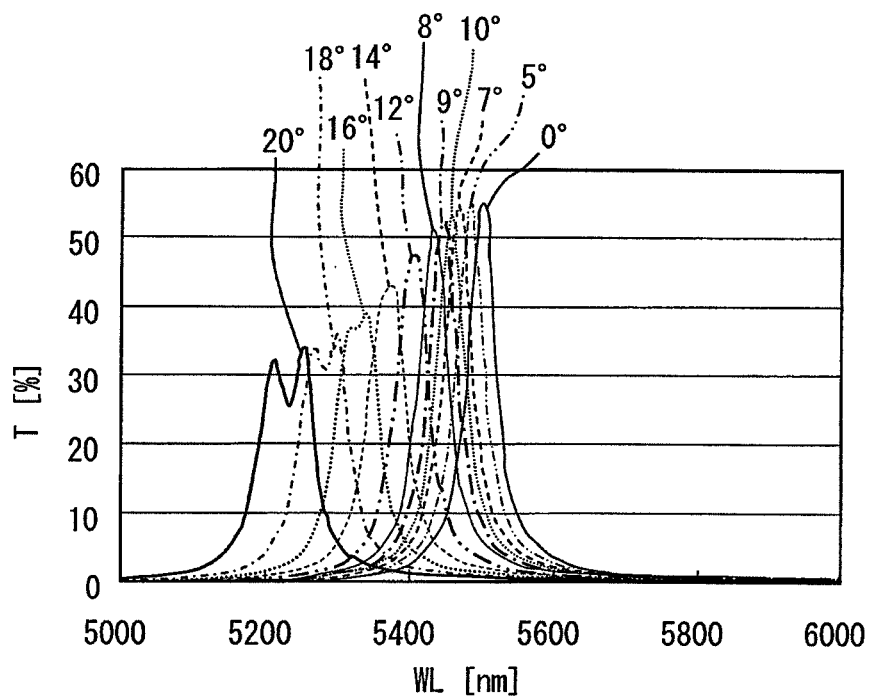
FIG. 16 is a diagram showing a relationship between a wavelength WL of a transmission light and a transmittance T for each incident angle when an incident light has a wavelength λ of 6 μm.
Figure 17:
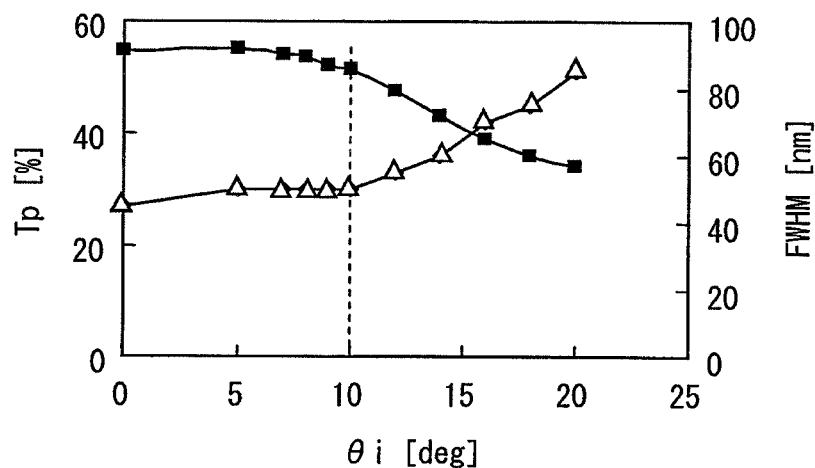
FIG. 17 is a diagram showing a relationship among an incident angle θI, a peak transmittance Tp, and a FWHM when the incident light has the wavelength λ of 6 μm.

The inventors performed similar simulations to an incident light having a different wavelength within the mid-wavelength infrared range. FIG. 14 shows a relationship between the wavelength (WL) of the transmission light and the transmittance (T) when the wavelength λ of the slanted incident light is equal to 2 μm. FIG. 15 shows a relationship of the incident angle θi, the peak transmittance (Tp), and the FWHM of the transmission light, which is obtained based on FIG. 14. In FIG. 15, a line connected by solid squares indicates the peak transmittance for each incident angle θi, and a line connected by hollow triangles indicates the FWHM of the transmission light. FIG. 16 shows a relationship between the wavelengths (WL) of the transmission light and the transmittance (T) when the wavelength λ of the slanted incident light is equal to 6 μm. FIG. 17 shows a relationship of the incident angle θi, the peak transmittance (Tp), and the FWHM of the transmission light, which is obtained based on FIG. 16. In FIG. 17, a line connected by solid squares indicates the peak transmittance for each incident angle θi, and a line connected by hollow triangles indicates the FWHM of the transmission light.

Similar to FIG. 12, FIG. 14 shows that when the incident angle θi increases, the wavelength of the transmission light shifts to a short-wavelength side. Further, as shown in FIG. 14, when the incident angle θi, which is equal to the diffraction angle θd, is equal to or larger than 22 degrees, a width of the FWHM of the transmission light increases with an increase in the incident angle θi. However, when the incident angle θi is equal to or larger than 22 degrees, a split occurs to the transmission light. Specifically, split is not occurred to the transmission light having the incident angle θi of 0 degree, 10 degrees, 15 degrees, 18 degrees, 19 degrees, 20 degrees, or 21 degrees. Further, split is occurred to the transmission light having the incident angle θi of 22 degrees, 23 degrees, or 25 degrees. As shown in FIG. 7, in a case where λ=2 μm, the diffraction angle θd (half value diffraction angle θdh) is smaller than 22 degrees when the mirror element width D is larger than 14 μm. That is, it is known that when the mirror element width D is larger than seven times of the wavelength λ (D>7λ), the split is restricted and the increase in the FWHM is restricted.

As shown in FIG. 15, when the incident angle θi is equal to or smaller than 10 degrees, the peak transmittance is maintained around 65% and the FWHM is maintained around 35 nm. Further, when the incident angle θi is larger than 10 degrees, the peak transmittance sharply decreases and the FWHM sharply increases with an increase in the incident angle θi. As shown in FIG. 7, in a case where λ=2 μm, when the mirror element width D is larger than 30 μm, the diffraction angle θd (half value diffraction angle θdh) becomes smaller than 10 degrees. That is, it is known that when the mirror element width D is equal to or larger than fifteen times of the wavelength λ (D>=15λ), the peak transmittance is maintained at a high level and the FWHM is further reduced.

Similar to FIG. 12, FIG. 16 shows that when the incident angle θi increases, the wavelength of the transmission light shifts to a short-wavelength side. Further, as shown in FIG. 16, when the incident angle θi, which is equal to the diffraction angle θd, is equal to or larger than 18 degrees, a width of the FWHM of the transmission light increases with an increase in the incident angle θi. However, when the incident angle θi is equal to or larger than 18 degrees, a split occurs to the transmission light. Specifically, split is not occurred to the transmission light having the incident angle θi of 0 degree, 5 degrees, 7 degrees, 8 degrees, 9 degrees, 10 degrees, 12 degrees, 14 degrees, or 16 degrees. Further, split is occurred to the transmission light having the incident angle θi of 18 degrees or 20 degrees. As shown in FIG. 9, in a case where λ=6 μm, the diffraction angle θd (half value diffraction angle θdh) is smaller than 18 degrees when the mirror element width D is larger than 40 μm. That is, it is known that when the mirror element width D is larger than seven times of the wavelength λ (D>7λ), the split is restricted and the increase in the FWHM is restricted.

As shown in FIG. 17, when the incident angle θi is equal to or smaller than 10 degrees, the peak transmittance is maintained around 55% and the FWHM is maintained around 50 nm. Further, when the incident angle θi is larger than 10 degrees, the peak transmittance sharply decreases and the FWHM sharply increases with an increase in the incident angle θi. As shown in FIG. 9, in a case where λ=6 μm, the diffraction angle θd (half value diffraction angle θdh) is smaller than 10 degrees when the mirror element width D is larger than 90 μm. That is, it is known that when the mirror element width D is equal to or larger than fifteen times of the wavelength λ (D>=15λ), the peak transmittance is maintained at a high level and the FWHM is further reduced.

As described above, the inventors of the present disclosure found that within the mid-wavelength infrared range (2 μm to 10 μm), when the mirror element width D is larger than seven times of the wavelength λ (D>7λ), the split is restricted and an increase in the FWHM is restricted as a second learning. Further, the inventors of the present disclosure found that within the mid-wavelength infrared range (2 μm to 10 μm), when the mirror element width D is equal to or larger than fifteen times of the wavelength λ (D>=15λ), the peak transmittance is increased and the FWHM is further reduced as a third learning.

The present disclosure is based on the foregoing learnings obtained by the inventors of the present disclosure, and the following will describe embodiments of the present disclosure with reference to the drawings.

First Embodiment

A Fabry-Perot interferometer according to the present embodiment is similar to the Fabry-Perot interferometer disclosed in JP 2008-134388 A, which is filed by the applicant of the present disclosure. Thus, description of similar parts of the Fabry-Perot interferometer will be omitted.

Figure 18:
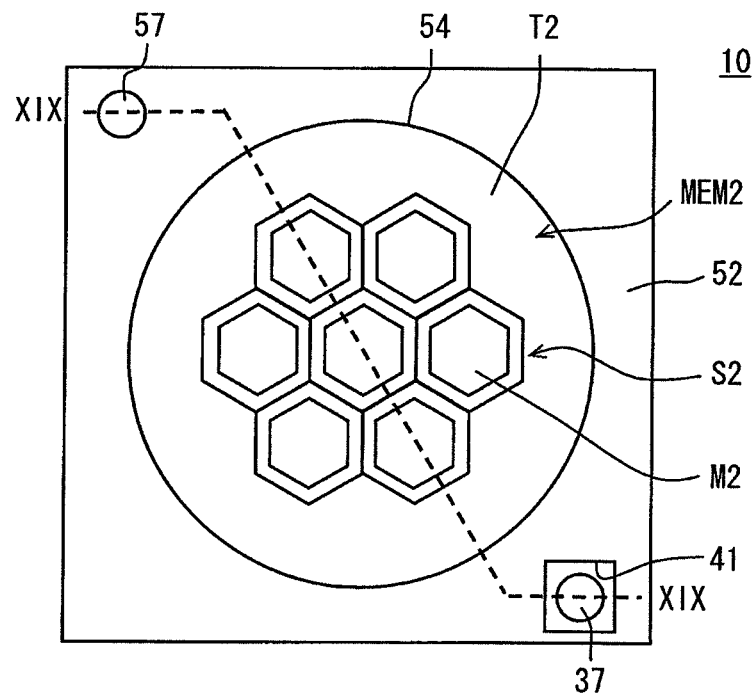
FIG. 18 is a plan view showing a configuration of a Fabry-Perot interferometer according to a first embodiment of the present disclosure.
Figure 19:
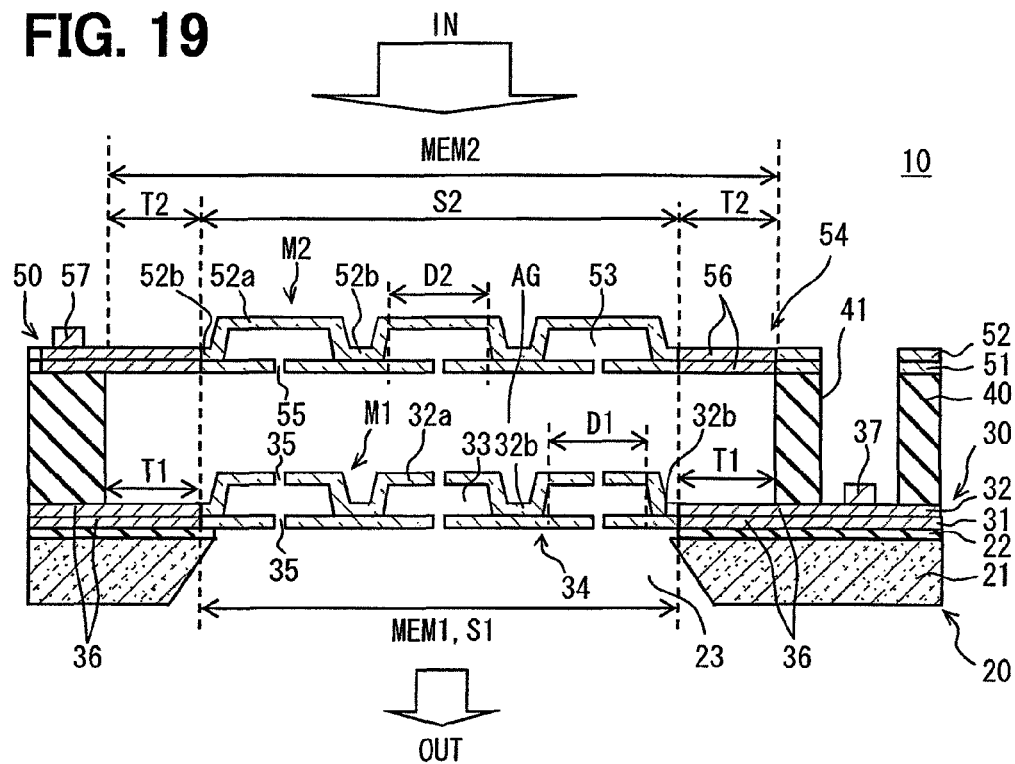
FIG. 19 is a cross-sectional view of the Fabry-Perot interferometer taken along line XIX-XIX in FIG. 18.

The following will describe a configuration of the Fabry-Perot interferometer 10 with reference to FIG. 18 and FIG. 19.

As shown in FIG. 18 and FIG. 19, the Fabry-Perot interferometer 10 includes a substrate 20, a first mirror 30, a spacer 40, and a second mirror 50. In the present embodiment, the second mirror 50 is arranged at an input side from which a light enters the Fabry-Perot interferometer 10 as shown by an arrow IN in FIG. 19, and the first mirror 30 is arranged at an output side from which the light exits from the Fabry-Perot interferometer 10 as shown by an arrow OUT in FIG. 19. Thus, the second mirror 50 is also referred to as an input mirror 50, and the first mirror 30 is also referred to as an output mirror 30. The output mirror 30 is paired with the input mirror 50.

The substrate 20 includes a semiconductor substrate 21 made of single crystal silicon and an insulation film 22 arranged on the semiconductor substrate 21. The insulation film 22 is made of silicone oxide film or silicon nitride film. The output mirror 30 is arranged on the insulation film 22 of the substrate 20. The substrate 20 has a first surface on which the insulation film 22 is arranged and a second surface that is opposite to the first surface. The second surface of the substrate is etched so that a through hole 23 is defined through the substrate 20. By etching the second surface of the substrate 20, a transmission portion S1 of the output mirror 30 is provided. The transmission portion S1 also functions as a first membrane MEM1, which is movable in the first direction. A part of the output mirror 30 that crosses the gap AG is defined as a bridge part 34. The bridge part of the output mirror 30 is also referred to as an output-side bridge part. The bridge part 34 includes the transmission portion S1 and a periphery portion T1 arranged around the transmission portion S1.

The output mirror 30 includes a pair of high-refractive layers that is arranged on the insulation film 22 of the substrate 20. The pair of high-refractive layers includes a first high-refractive layer 31 arranged on the insulation film 22 of the substrate 20 and a second high-refractive layer 32 arranged on an opposite side of the first high-refractive layer 31 from the insulation film 22. Each of the first high-refractive layer 31 and the second high-refractive layer 32 is made of a material having a refractive index larger than air. For example, each of the first high-refractive layer 31 and the second high-refractive layer 32 may be provided by a semi-conducting film, which is made of at least one of silicon material or germanium material. In the present embodiment, both the first high-refractive layer 31 and the second high-refractive layer 32 are made of polysilicon.

The output mirror 30 includes the transmission portion S1, which is provided by a part of the first high-refractive layer 31, a part of the second high-refractive layer 32, and a space layer 33 sandwiched between the first high-refractive layer 31 and the second high-refractive layer 32 as a low-refractive layer. A structure in which the space layer 33 is sandwiched by the high-refractive layers 31, 32 provide a mirror element M1. The mirror element M1 has an optical multiple layer structure. The transmission portion S1 may have at least one mirror element M1. FIG. 19 shows an example in which the transmission portion S1 has multiple mirror elements M1 as a mirror element group. As shown in FIG. 18 and FIG. 19, each mirror element M1 of the output mirror 30 is arranged facing to a mirror element M2 of the input mirror 50. Similar to the output mirror 30, the input mirror 50 may have one mirror element M2 or multiple mirror elements M2 as a mirror element group. The mirror element M2 of the input mirror 50 is arranged at a central region of a second membrane MEM2 of the input mirror 50. The membrane MEM2 of the input mirror 50 approximately has a circular plate shape, and is movable in the first direction. Within a range of the transmission portion S1 of the output mirror 30, the second high-refractive layer 32 includes a floating section 32a and a supportive section 32b. The floating section 32a is arranged apart from the first high-refractive layer 31, and the space layer 33 is sandwiched between the floating section 32a and the first high-refractive layer 31. The supportive section 32b, a part of which is contacted with the first high-refractive layer 31, supports the floating section 32a to be located above the first high-refractive layer 31 via the space layer 33. The supportive section 32b includes a first sub-section that supports a side surface of the space layer 33 and a second sub-section that is contacted with the first high-refractive layer 31. In the present embodiment, the supportive section 32b is arranged along a periphery portion of the mirror element. M1, and defines a shape of the mirror element M1. The space layer 33 is divided by the supportive section 32b into multiple space elements 33 so that the multiple mirror elements M1 are provided within the transmission portion S1. In the present embodiment, the multiple mirror elements M1 are arranged in a honeycomb manner. The multiple mirror elements M1 of the output mirror 30 have the same dimensions, and configure the transmission portion S1 of the output mirror 30. A minimum width of an upper surface of each space element 33 is defined as a width D1 of the mirror element M1, and a direction along the width D1 of the mirror element M1 is defined as the second direction.

In the periphery portion T1 of the output mirror 30, the first high-refractive layer 31 is contacted with the second high-refractive layer 32. In the output mirror 30, the periphery portion T1 and an outer portion arranged around outside of the periphery portion T1 are supported by the substrate 20. The bridge part 34 is arranged facing a bridge part 54 of the input mirror 50. The bridge part 54 of the input mirror 50 functions as a second membrane MEM2, which is movable in the first direction.

As shown in FIG. 19, through holes 35 are defined by each of the first high-refractive layer 31 and the second high-refractive layer 32. The space layer 33 and the gap AG are formed by etching from the second surface of the substrate 20 through the through holes 35. Each of the first high-refractive layer 31 and the second high-refractive layer 32 includes an electrode 36, which is formed by implanting p-type impurity ions. Each of the electrodes 36 is arranged such that a part of the electrode 36 of the output mirror 30 faces a part of an electrode 56 of the input mirror 50. The output mirror 30 further includes a pad 37 arranged on the second high-refractive layer 32. In the present embodiment, the pad 37 is made of Ag—Cu alloy, and is in an ohmic contact with the electrode 36.

The Fabry-Perot interferometer 10 according to the present embodiment further includes a spacer 40 arranged between the input mirror 50 and the output mirror 30. Specifically, the spacer 40 is arranged on a predetermined region of the second high-refractive layer 32 of the output mirror 30 other than a region on which the bridge part 34, the pad 37 are arranged. The spacer 40 supports the input mirror 50 above the output mirror 30 so that the gap AG is defined between the input mirror 50 and the output mirror 30. In the present embodiment, the spacer 40 is made of silicon dioxide. A middle portion of the spacer 40 corresponding to the bridge part 34 and the bridge part 54, which will be described later, are hollowed out so that the gap AG is defined between the input mirror 50 and the output mirror 30. In the spacer 40, an opening 41 is defined corresponding to the pad 37 so that the pad 37 is exposed to outside.

The input mirror 50 includes a pair of high-refractive layers including a first high-refractive layer 51 and a second high-refractive layer 52. The first high-refractive layer 51 is arranged on a surface of the spacer 40 so that the gap AG is defined between the first high-refractive layer 51 of the input mirror 50 and the second high-refractive layer 32 of the output mirror 30. The second high-refractive layer 52 is arranged on the first high-refractive layer 51. Each of the first high-refractive layer 51 and the second high-refractive layer 52 is made of a material having a refractive index larger than air. For example, each of the first high-refractive layer 51 and the second high-refractive layer 52 may be provided by a semi-conducting film, which is made of at least one of silicon material or germanium material. In the present embodiment, both the first high-refractive layer 51 and the second high-refractive layer 52 are made of polysilicon. A part of the input mirror 50 that crosses the gap AG is defined as the bridge part 54. The bridge part 54 of the input mirror 50 is also referred to as an input-side bridge part. The bridge part 54 includes a transmission portion S2 and a periphery portion T2 arranged around the transmission portion S2.

The transmission portion S2 is provided by a part of the first high-refractive layer 51, a part of the second high-refractive layer 52, and a space layer 53 as a low-refractive layer. The space layer 53 is sandwiched between the first high-refractive layer 51 and the second high-refractive layer 52. A structure in which the space layer 53 is sandwiched by the high-refractive layers 51, 52 provide a mirror element M2. The mirror element M2 has an optical multiple layer structure. The transmission portion S2 may have at least one mirror element M2. FIG. 19 shows an example in which the transmission portion S2 has multiple mirror elements M2 as a mirror element group. As shown in FIG. 18 and FIG. 19, the mirror elements M2 are arranged at the central region of the second membrane MEM2 of the input mirror 50, which has the circular plate shape. Within a range of the transmission portion S2 of the input mirror 50, the second high-refractive layer 52 includes a floating section 52a and a supportive section 52b. The floating section 52a is arranged apart from the first high-refractive layer 51, and the space layer 53 is sandwiched between the floating section 52a and the first high-refractive layer 51. The supportive section 52b, a part of which is contacted with the first high-refractive layer 51, supports the floating section 52a to be located above the first high-refractive layer 51 via the space layer 53. The supportive section 52b includes a first sub-section that supports a side surface of the space layer 53 and a second sub-section that is contacted with the first high-refractive layer 51. In the present embodiment, the supportive section 52b is arranged along a periphery portion of the mirror element M2, and defines a shape of the mirror element M2. The space layer 53 is divided by the supportive section 52b into multiple space elements 53 so that the multiple mirror elements M2 are provided within the transmission portion S2. In the present embodiment, the multiple mirror elements M2 of the input mirror 50 are arranged in a honeycomb manner corresponding to the multiple mirror elements M1 of the output mirror 30. The multiple mirror elements M2 have the same dimensions, and configure the transmission portion S2 of the input mirror 50. A minimum width of an upper surface of each space element 53 is defined as a width D2 of the mirror element M2. In the present embodiment, the mirror elements M1 of the output mirror 30 are arranged corresponding to respective mirror elements M2 of the input mirror 50. Each mirror element M1 and a corresponding mirror element M2 have the same pattern and dimensions. The width D1 of the mirror element M1 is the same with the width D2 of the mirror element M2.

In the periphery portion T2 of the input mirror 50, the first high-refractive layer 51 is contacted with the second high-refractive layer 52. In the input mirror 50, an outer portion arranged around outside of the periphery portion T2 are supported by the spacer 40.

As shown in FIG. 19, multiple through holes 55 are defined by the first high-refractive layer 51. The space layer 53 is formed by etching from the gap AG through the through holes 55. Each of the first high-refractive layer 51 and the second high-refractive layer 52 includes an electrode 56, which is formed by implanting p-type impurity ions. The input mirror 50 further includes a pad 57 arranged on the second high-refractive layer 52. In the present embodiment, the pad 57 is made of Ag—Cu alloy, and is in an ohmic contact with the electrode 56.

With above-described configuration, when a driving voltage is applied between the electrodes 36, 56 via the respective pads 37, 57, the first membrane MEM1 of the output mirror 30 and the second membrane MEM2 of the input mirror 50 move in the first direction toward each other due to an electrostatic force generated between the electrodes 36, 56. When the first membrane MEM1 and the second membrane MEM2 move toward each other, a distance between the mirror element M1 and the mirror element M2 changes. Thus, infrared lights are selectively transmitted through the Fabry-Perot interferometer 10 based on the wavelength.

The high-refractive layers 31, 32, 51, 52 are made of polysilicon. Thus, the high-refractive layers 31, 32, 51, 52 are appropriate to the infrared lights having a wavelength of 2 μm to 10 μm. Further, the high-refractive layers 31, 32, 51, 52 may be provided by semiconducting films including at least one of polygermanium, polysilicon-germanium, silicon, or germanium so that the high-refractive layers 31, 32, 51, 52 are appropriate to the infrared lights having a wavelength of 2 μm to 10 μm.

As described above, the space layers 33, 53 are employed as the low-refractive layers of the mirror elements M1, M2. Thus, a refractive index ratio n1/n2 of the refractive index n1 of the high-refractive layer 31, 32, 51, 52 to the refractive index n2 of the low-refractive layer 33, 53 can have a relatively large value. For example, the refractive index of silicon is 3.45, and the refractive index of germanium is 4, while the refractive index of air is 1. Thus, the refractive index ratio n1/n2 can have a value larger than 3.3. With this configuration, the infrared light having a wavelength within a range of 2 μm to 10 μm transmits through the Fabry-Perot interferometer 10. Thus, a cost reduction is achieved with the Fabry-Perot interferometer 10 according to the present embodiment.

The transmission portion S1 includes multiple mirror elements M1, and the transmission portion S2 includes multiple mirror elements M2. Thus, when an area of the transmission portion S1 and an area of the transmission portion S2 are constant, the multiple mirror element structure increase a mechanical strength compared with a structure in which single mirror is provided within each of the transmission portion S1 and the transmission portion S2. Further, the supportive sections 32b, 52b are provided by respective second high-refractive layers 32, 52. Thus, the structure of the Fabry-Perot interferometer 10 is simplified compared with a case in which the floating sections 32a, 52a are supported by separate components.

Further, the substrate 20 defines the through hole 23 corresponding to the transmission portion S1. Thus, the infrared lights are restricted to be absorbed by the substrate 20. That is, a loss of the infrared lights is restricted.

The following will describe features of the Fabry-Perot interferometer 10 according to the present embodiment.

As shown in FIG. 19, the arrows IN and the arrow OUT indicate a transmission direction of the light. Based on the above-described second learning by the inventors of the present disclosure, all of the mirror elements M2 of the input mirror 50 have respective widths D2, which are larger than seven times of a maximum value of a mid-wavelength infrared range. Hereinafter, the mirror element M2 of the input mirror 50 having the width D2 larger than seven times of the maximum value of a mid-wavelength infrared range is also referred to as a diffraction restriction mirror. As described above, the mid-wavelength infrared range is from 2 μm to 10 μm. Thus, the width D2 of each mirror element M2 is larger than 70 μm, which is seven times of 10 μm (D2>70 μm). The mirror element M2 having the width D2 larger than 70 μm is also referred to as a diffraction restriction mirror. With this configuration, the transmission light passing through the input mirror element M2 are not split within the mid-wavelength infrared range. Thus, a difficulty in correctly detecting a peak transmittance of compositions in a composition analysis due to the split is restricted. Further, the diffraction angle θd is reduced compared with a case in which the split occurs. Thus, the FWHM of the transmission light is reduced. As described above, the Fabry-Perot interferometer 10 without split occurrence is more appropriate to detect compositions of gas and liquid, whose absorption wavelength lay within the mid-wavelength infrared range compared with a conventional Fabry-Perot interferometer 10 in which the split occurs. In the present embodiment, each mirror element M1 of the output mirror 30 also has a width D1 larger than seven times of the maximum value of mid-wavelength infrared range.

That is, the width D1 of each output mirror element M1 is larger than 70 µm (D1>70 µm).

Further, based on the second learning, the width D2 of each mirror element M2 of the input mirror 50 is set at least equal to or larger than ten times of the maximum value of the mid-wavelength infrared range. That is, the width D2 of each mirror element M2 of the input mirror 50 is equal to or larger than 100 µm (D2>=100 µm). With this configuration, the half value diffraction angle $\theta$dh can be reduced within the mid-wavelength infrared range. Thus, the FWHM of the transmission light is further reduced within the mid-wavelength infrared range.

Based on the above-described third learning, at least the width D2 of each mirror element M2 of the input mirror 50 is set equal to or larger than fifteen times of the maximum value of the mid-wavelength infrared range. That is, the width D2 of each mirror element M2 of the input mirror 50 is set equal to or larger than 150 µm (D2>=150 µm). With this configuration, the FWHM of the transmission light is further reduced within the mid-wavelength infrared range, and the peak transmittance of the transmission light at peak wavelength is increased. Thus, the FWHM of the transmission light within the mid-wavelength infrared range is further reduced. The mirror elements M1, M2 include the space layers 33, 53, respectively, as the low-refractive layers. Thus, maximum values of the widths D1, D2 of respective mirror elements M1, M2 are around 150 µm considering the mechanical strength of the mirror elements M1, M2. Thus, when at least the width D2 of the mirror element M2 of the input mirror 50 is set as 150 µm, the FWHM of the transmission light within the mid-wavelength infrared range is further reduced.

In the present embodiment, the first membrane MEM1 of the output mirror 30 is provided by the transmission portion S1. Further, the first membrane MEM1 of the output mirror 30 may be provided by the whole bridge part 34 of the output mirror 30 similar to the second membrane MEM2 of the input mirror 50. Further, the width D1 of the mirror element M1 of the output mirror 30 may be set smaller than the width D2 of the mirror element M2 of the input mirror 50. In the present embodiment, the light enters the Fabry-Perot interferometer 10 from the second mirror 50, and exits from the first mirror 30. Thus, the second mirror 50 is defined as the input mirror, and the first mirror 30 is defined as the output mirror. Further, the light may pass through the Fabry-Perot interferometer 10 in an opposite direction from the direction described in the present embodiment. That is, the light may enter the Fabry-Perot interferometer 10 from the first mirror 30, and exits from the second mirror 50. In this case, the first mirror 30 functions as the input mirror 30, and the second mirror 50 functions as the output mirror 50.

In the present embodiment, the supportive sections 32b, 52b is provided by a part of the second high-refractive layer 32, 52. Further, the supportive sections 32b, 52b may be provided by a separate component other than the part of the second high-refractive layer 32, 52.

In the present embodiment, each mirror element M1, M2 has multiple layers including the space layer 33, 53. With this configuration, a refractive index ratio of the refractive index of the high-refractive layer 31, 32, 51, 52 to the refractive index of the low-refractive layer 33, 53 provided by the space layer 33, 53 can have a relatively large value. Thus, a wide high-reflectance band is provided and, accordingly, a wide spectroscopy band is provided.

Further, based on the studies performed by the inventors of the present disclosure, the inventors found that when the diffraction angle $\theta$d is larger than a predetermined value, the FWHM of the transmission light increases with an increase of the diffraction angle $\theta$d and a split occurs in the transmission light. That is, multiple peak transmittance occurs at multiple wavelengths. Based on the learnings obtained by the studies, the width D2 of the mirror element M2 of at least the input mirror 50 is set larger than seven times of a maximum wavelength of the transmission light, which have a wavelength range of 2 µm to 10 µm. In this case, the input mirror 50 functions as a diffraction restriction mirror. With this configuration, the split is not occurred to the transmission light within the mid-wavelength infrared range. Thus, a difficulty in correctly detecting a peak transmittance of compositions in a composition analysis due to the split is restricted. Further, the diffraction angle $\theta$d in the present embodiment is smaller than a predetermined angle at which the split occurs. Thus, the FWHM of the transmission light is reduced. As described above, the Fabry-Perot interferometer 10 without split occurrence is more appropriate to detect compositions of gas and liquid, whose absorption wavelength lay within the mid-wavelength infrared range compared with a conventional Fabry-Perot interferometer 10 in which the split occurs.

In the present embodiment, the width of the diffraction restriction mirror is set equal to or larger than ten times of the maximum wavelength of the transmission light.

Based on the studies performed by the inventors, when the width of the mirror decreases, the diffraction angle $\theta$d increases and an energy ratio of the diffraction light to the transmission light increases. As described above, when the standardized light energy of the diffraction light is equal to half of the light energy of the rectilinear propagation light, the diffraction angle $\theta$d is referred to as a half value diffraction angle $\theta$dh. The inventors obtained from the studies that in a relationship between the minimum width of the mirror element M1, M2 and the half value diffraction angle $\theta$dh, an inflection point exists, and when the minimum width of the mirror element M1, M2 is smaller than a width corresponding to the inflection point, half value diffraction angle $\theta$dh sharply increases.

In the present embodiment, the second mirror 50 arranged on an input side of the light is set as the diffraction restriction mirror. Thus, the minimum width of the input mirror 50 is larger than a width corresponding to the inflection point so that the half value diffraction angle $\theta$dh is reduced. Thus, the FWHM of the transmission light within the mid-wavelength infrared range is reduced.

In the present embodiment, the width of the diffraction restriction mirror is further set equal to or larger than fifteen times of the maximum wavelength of the transmission light.

Based on the studies performed by the inventors, the FWHM of the transmission light and the peak transmittance are maintained around a predetermined level when the diffraction angle $\theta$d is equal to or smaller than a predetermined angle. When the diffraction $\theta$d is larger than the predetermined angle, the FWHM of the transmission light increases sharply and the peak transmittance decreases sharply.

In the present embodiment, based on the above-described learning, the mirror arranged at the input side of the light is set as the diffraction restriction mirror. With this configuration, within the mid-wavelength infrared range, the FWHM of the transmission light is reduced and the peak transmittance of the transmission light is increased. Accordingly, within the mid-wavelength infrared range, the FWHM of the transmission light is further reduced.

Second Embodiment

The following will describe a Fabry-Perot interferometer 10 according to a second embodiment of the present disclosure. In the present embodiment, same or equivalent parts of the Fabry-Perot interferometer 10 with the first embodiment will be omitted.

Figure 20:
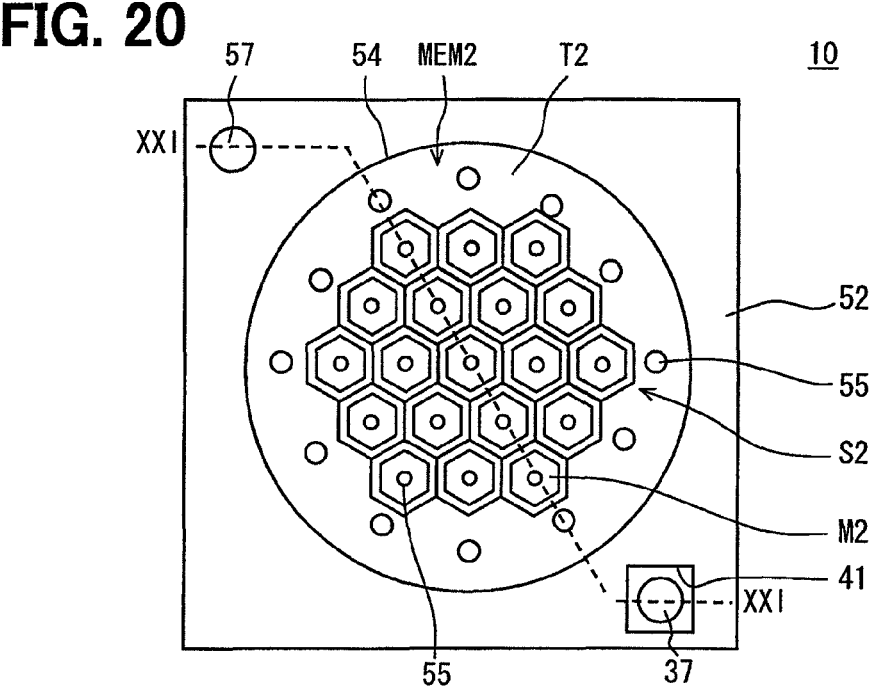
FIG. 20 is a plan view showing a configuration of a Fabry-Perot interferometer according to a second embodiment of the present disclosure.
Figure 21:
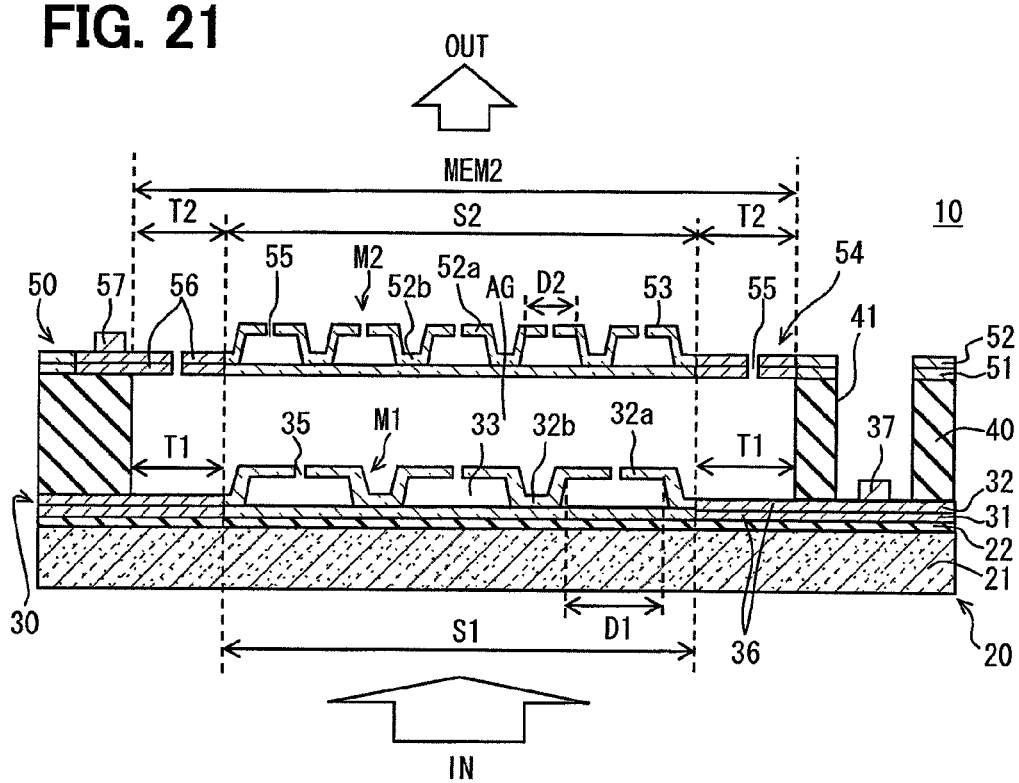
FIG. 21 is a cross-sectional view of the Fabry-Perot interferometer taken along line XXI-XXI in FIG. 20.

As shown in FIG. 20 and FIG. 21, the light enters the first mirror 30 arranged adjacent to the substrate 20, and exits from the mirror second 50 arranged apart from the substrate 20. Thus, in the present embodiment, the first mirror 30 is referred to as an input mirror, and the second mirror 50 is referred to as an output mirror. As shown in FIG. 21, in the present embodiment, the through hole 23 is not defined in the substrate 20. Thus, the input mirror 30 does not include the movable first membrane MEM1. Further the width D1 of the mirror element M1 of the input mirror 30 is larger than the width D2 of the mirror element M2 of the output mirror 50. Further, in the output mirror 50, through holes 55 are defined in a part of a high-refractive layer 52, which is included in the mirror element M2. Further, in the output mirror 50, through holes are further defined in the high-refractive layers 51, 52, which provide a part of the periphery portion T2. The through holes 55 are defined so that the space layer 53 and the gap AG are formed by etching through the through holes 55. Further, in the mirror elements M1 of the input mirror 30, through holes 35 are defined in the high-refractive layer 32 so that the space layer 33 is formed by etching through the through holes 55, 35. Other parts of the Fabry-Perot interferometer 10 according to the present embodiment are similar to the Fabry-Perot interferometer 10 according to the first embodiment.

Similar to the first embodiment, at least the width D1 of each mirror element M1 of the input mirror 30 is set larger than seven times of the maximum value of the mid-wavelength infrared range. That is, the width D1 of each mirror element M1 of the input mirror 30 is set larger than 70 μm (D1>70 μm). Further, the width D1 of each mirror element M1 of the input mirror 30 may be set equal to or larger than ten times of the maximum value of the mid-wavelength infrared range. That is, the width D1 of each mirror element M1 of the input mirror 30 may be set equal to or larger than 100 μm (D1>=100 μm). Furthermore, the width D1 of each mirror element M1 of the input mirror 30 may be set equal to or larger than fifteen times of the maximum value of the mid-wavelength infrared range. That is, the width D1 of each mirror element M1 of the input mirror 30 may be set equal to or larger than 150 μm (D1>=150 μm). With the above-described configuration, advantages similar to the first embodiment are provided by the Fabry-Perot interferometer 10 according to the present embodiment.

Further, in the present embodiment, the width D1 of each mirror element M1 of the input mirror 30 is set larger than the width D2 of each mirror element M2 of the output mirror 50. Thus, an increase of the FWHM of the transmission light is restricted compared with a case in which the width D1 and the width D2 are the same or the width D2 is larger than the width D1.

Further, in the present embodiment, the first mirror 30, which has no membrane MEM1, functions as the input mirror 30. Further, the width D1 of each mirror element M1 of the input mirror 30 is larger than the width D1 of each mirror element M2 of the output mirror 50. Since the input mirror 30 does not include the first membrane MEM1, the width of D1 of each mirror element M1 of the input mirror 30 can be easily set larger than the width D2 of each mirror element M2 of the output mirror 50. Further, the output mirror 50 includes the second membrane MEM2. Thus, the width D2 of each mirror element M2 of the output mirror 50 can be decreased in order to increase a ratio of the supportive section 52b to the transmission portion S2. With this configuration, the mechanical strength of the output mirror 50 is secured. As described above, in the Fabry-Perot interferometer 10 according to the present embodiment, the FWHM of the transmission light is reduced and the mechanical strength is improved. Further, the width D2 of each mirror element M2 of the output mirror 50 is not limited to a predetermined range when the width D2 of each mirror element M2 of the output mirror 50 is smaller than the width D1 of each mirror element M1 of the input mirror 30.

Third Embodiment

The following will describe a Fabry-Perot interferometer 10 according to a third embodiment of the present disclosure. Same or equivalent parts of the Fabry-Perot interferometer 10 with the foregoing embodiments will be omitted. In the present embodiment, the light may enter the Fabry-Perot interferometer 10 from any one of the first mirror 30 and the second mirror 50.

Figure 22:
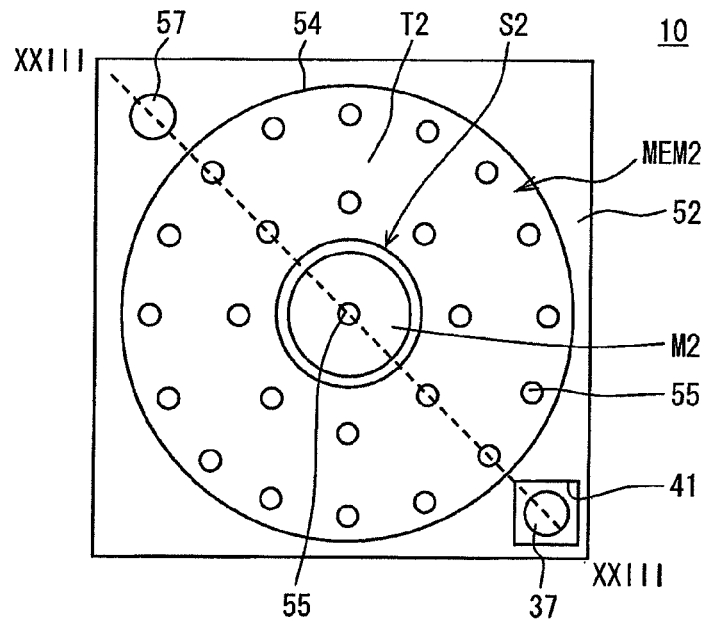
FIG. 22 is a plan view showing a configuration of a Fabry-Perot interferometer according to a third embodiment of the present disclosure.
Figure 23:
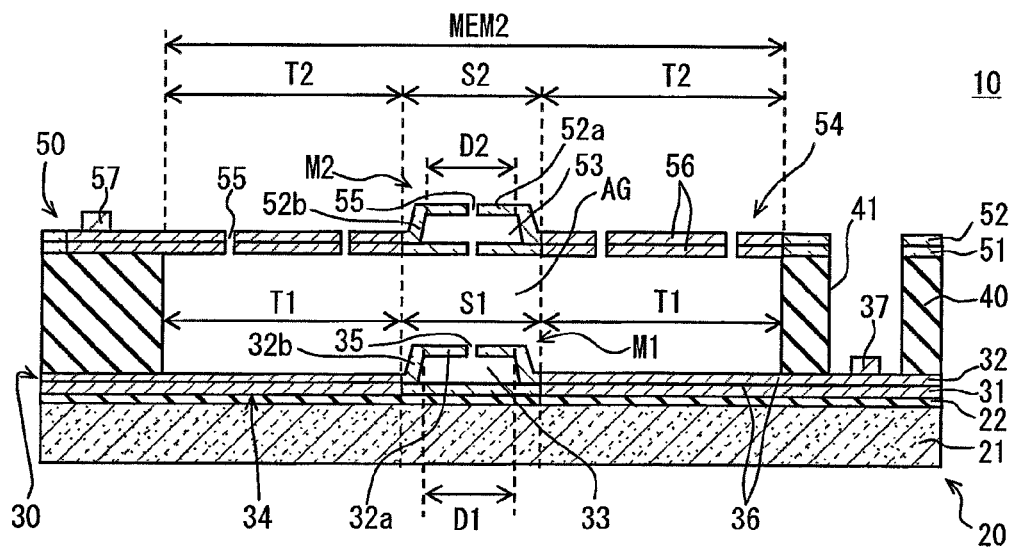
FIG. 23 is a cross-sectional view of the Fabry-Perot interferometer taken along line XXIII-XXIII in FIG. 22.
Figure 24:
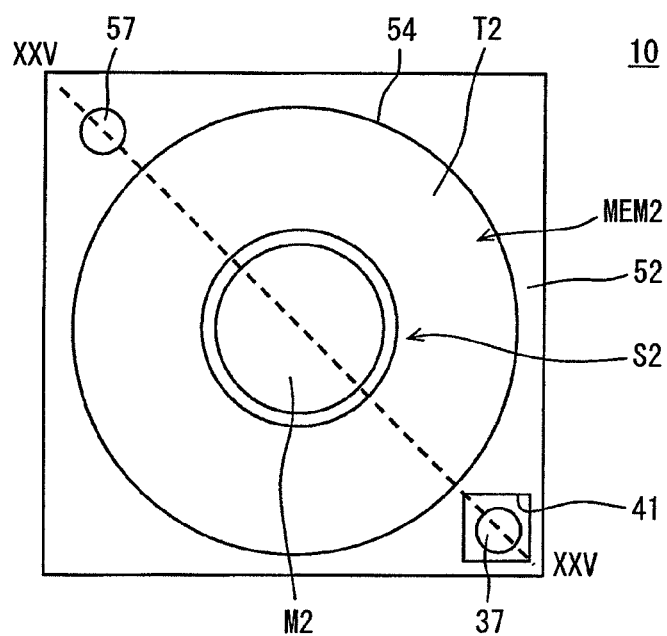
FIG. 24 is a plan view showing a configuration of a Fabry-Perot interferometer according to a fourth embodiment of the present disclosure.
Figure 25:
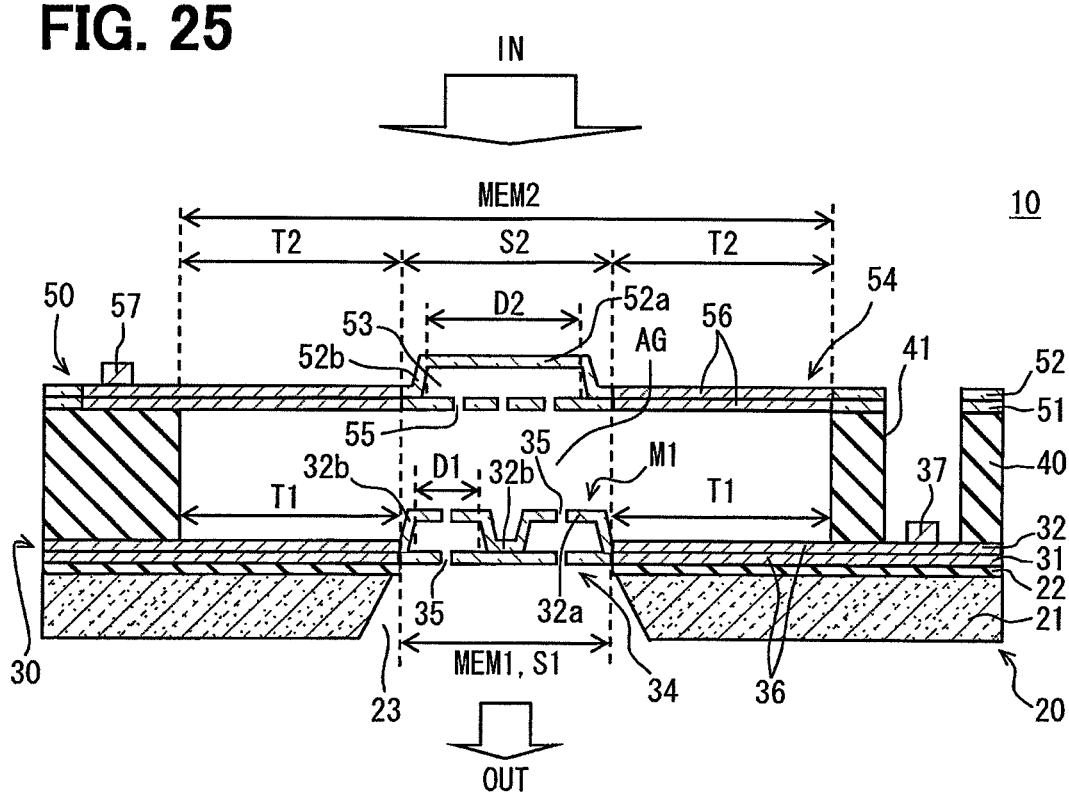
FIG. 25 is a cross-sectional view of the Fabry-Perot interferometer taken along line XXV-XXV in FIG. 24.

As shown in FIG. 22 and FIG. 23, the transmission portion S1 of the first mirror 30 has only one mirror element M1, and the transmission portion S2 of the second mirror 50 has only one mirror element M2. Further, the mirror element M1 and the mirror element M2 have the same formation pattern and the same dimension. That is, the width D1 of the mirror element M1 is the same with the width D2 of the mirror element M2. Other parts of the Fabry-Perot interferometer 10 according to the present embodiment are similar to the Fabry-Perot interferometer 10 according to the second embodiment.

For example, when the second mirror 50 function as the input mirror 50 and the first mirror 30 functions as the output mirror 30 similar to the first embodiment, at least the width D2 of the mirror element M2 of the input mirror 50 is set larger than seven times of the maximum value of the mid-wavelength infrared range. That is, the width D2 of the mirror element M2 of the input mirror 50 is set larger than 70 μm (D2>70 μm). Further, the width D2 of the mirror element M2 of the input mirror 50 may be set equal to or larger than ten times of the maximum value of the mid-wavelength infrared range. That is, the width D2 of the mirror element M2 of the input mirror 50 may be set equal to or larger than 100 μm (D2>=100 μm). Furthermore, the width D2 of the mirror element M2 of the input mirror 50 may be set equal to or larger than fifteen times of the maximum value of the mid-wavelength infrared range. That is, the width D2 of the mirror element M2 of the input mirror 50 may be set equal to or larger than 150 μm (D2>=150 μm). With this configuration, advantages similar to the first embodiment are provided by the Fabry-Perot interferometer 10 according to the present embodiment.

Further, in the present embodiment, the transmission portion S2 of the input mirror 50 has only one mirror element M2. Thus, interference of light is restricted compared with a structure in which the input mirror 50 includes multiple mirror elements M2, each of which functions as a slit. Thus, the FWHM of the transmission light is reduced in the Fabry-Perot interferometer 10 according to the present embodiment.

Fourth Embodiment

The following will describe a Fabry-Perot interferometer 10 according to a fourth embodiment of the present disclosure. Same or equivalent parts of the Fabry-Perot interferometer 10 with the foregoing embodiments will be omitted.

Similar to the first embodiment, the through hole 23 is defined in the substrate 20 corresponding to the transmission portion S1. Different from the first embodiment, in the present embodiment, the transmission portion S2 of the input mirror 50 has only one mirror element M2, and the transmission portion S1 of the output mirror 30 has multiple mirror elements M1.

In the present embodiment, at least the width D2 of the mirror element M2 of the input mirror 50 is set larger than seven times of the maximum value of the mid-wavelength infrared range. That is, the width D2 of the mirror element M2 of the input mirror 50 is set larger than 70 μm (D2>70 μm). Further, the width D2 of the mirror element M2 of the input mirror 50 may be set equal to or larger than ten times of the maximum value of the mid-wavelength infrared range. That is, the width D2 of the mirror element M2 of the input mirror 50 may be set equal to or larger than 100 μm (D2>=100 μm). Furthermore, the width D2 of the mirror element M2 of the input mirror 50 may be set equal to or larger than fifteen times of the maximum value of the mid-wavelength infrared range. That is, the width D2 of the mirror element M2 of the input mirror 50 may be set equal to or larger than 150 μm (D2>=150 μm). With the above-described configuration, advantages similar to the first embodiment are provided by the Fabry-Perot interferometer 10 according to the present embodiment.

In the present embodiment, the substrate 20 defines the through hole 23 corresponding to the transmission portion S1. Thus, the infrared lights are restricted to be absorbed by the substrate 20. That is, a loss of the infrared lights is restricted.

In the present embodiment, the transmission portion S2 of the input mirror 50 has only one mirror element M2. Thus, interference of light is restricted compared with a structure in which the input mirror 50 includes multiple mirror elements M2, each of which functions as a slit. With this configuration, the FWHM of the transmission light is reduced.

Further, in the present embodiment, the width D2 of the mirror element M2 of the input mirror 50 is set larger than the width D1 of the mirror element M1 of the output mirror 30. Thus, an increase of the FWHM of the transmission light due to the diffraction is restricted. Further, the width D1 of each mirror element M1 of the output mirror 30 is set relatively small so that a ratio of the supportive section 32b to the transmission portion S1 is increased. By this configuration, the mechanical strength of the first membrane MEM1 is increased. Further, when the width D1 of each mirror element M1 of the output mirror 30 is smaller than the width D2 of the mirror element M2 of the input mirror 50 (D1<D2), the width D1 is not limited to a predetermined range.

In the present embodiment, the second mirror 50 is referred to as the input mirror 50, the first mirror 30 is referred to as the output mirror 30, the transmission portion S2 has only one mirror element M2, and the transmission portion S1 has multiple mirror elements M1. Further, the first mirror 30 may function as the input mirror, the second mirror 50 may function as the output mirror, the transmission portion S1 may have only one mirror element M1, and the transmission portion S2 may have multiple mirror elements M2.

Fifth Embodiment

The following will describe a Fabry-Perot interferometer 10 according to a fifth embodiment of the present disclosure. Same or equivalent parts of the Fabry-Perot interferometer 10 with the foregoing embodiments will be omitted.

Figure 26:
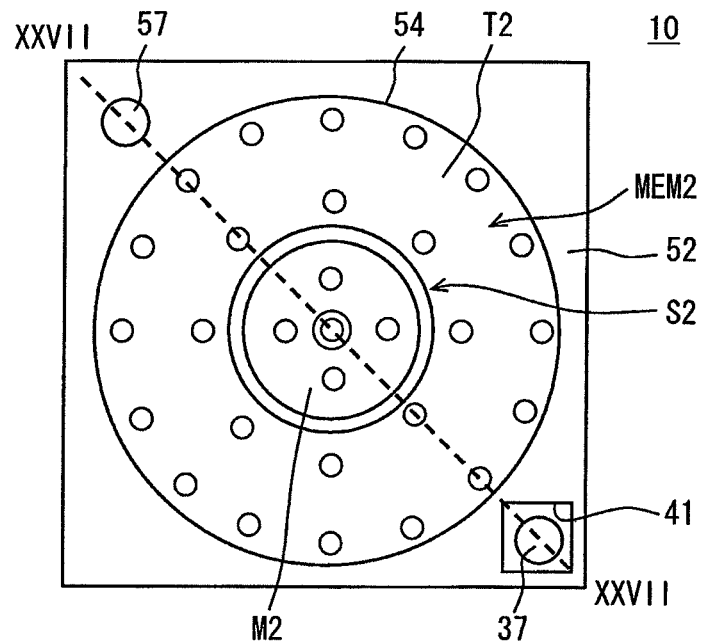
FIG. 26 is a plan view showing a configuration of a Fabry-Perot interferometer according to a fifth embodiment of the present disclosure.
Figure 27:
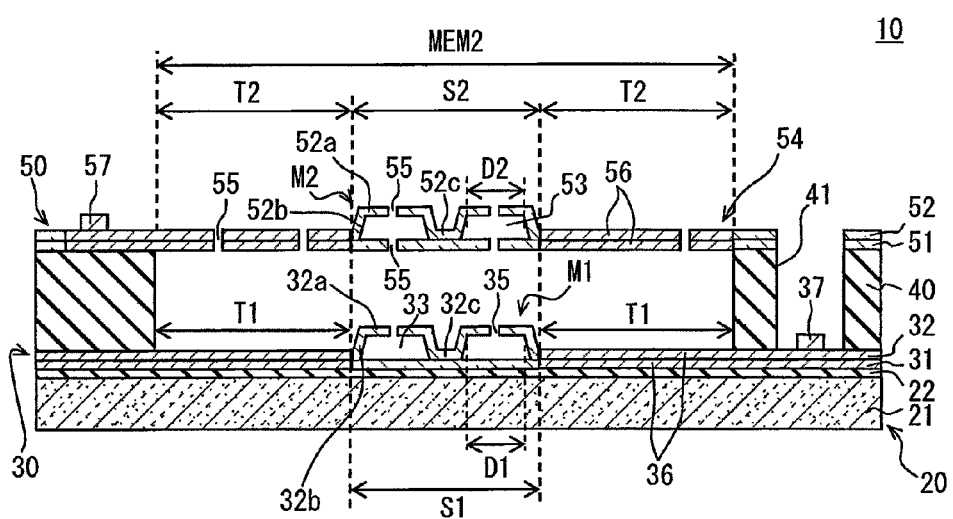
FIG. 27 is a cross-sectional view of the Fabry-Perot interferometer taken along line XXVII-XXVII in FIG. 26.

As shown in FIG. 26 and FIG. 27, the Fabry-Perot interferometer 10 according to the present embodiment has similar configurations to the Fabry-Perot interferometer 10 according to the third embodiment. In the present embodiment, in the first mirror 30, a supportive section 32c, which is provided by a part of the second high-refractive layer 32, is arranged on the first high-refractive layer 31. Thus, the floating section 32a of the second high-refractive layer 32 is supported by the supportive section 32c above the first high-refractive layer 31. The supportive section 32c is in contact with the first high-refractive layer 31 in an overlapped manner within the transmission portion S1 of the first mirror 30. Similarly, in the second mirror 50, a supportive section 52c, which is provided by a part of the second high-refractive layer 52, is arranged on the first high-refractive layer 51. Thus, the floating section 52a of the second high-refractive layer 52 is supported by the supportive section 52c above the first high-refractive layer 51. The supportive section 52c is in contact with the first high-refractive layer 51 in an overlapped manner within transmission portion S2 of the second mirror 50. In the present embodiment, the supportive section 32c, 52c does not define a shape of the mirror element M1, M2. Specifically, the supportive section 32c does not divide the mirror element M1 into multiple mirror elements M1, and the supportive section 52c does not divide the mirror element M2 into multiple mirror elements M2. In the present embodiment, as shown in FIG. 26, FIG. 27, the supportive sections 32c is arranged in a central portion of the mirror element M1 having a circular shape, and the supportive section 52c is arranged in a central portion of the mirror element M2 having a circular shape. Thus, the mirror element M1 and the mirror element M2 are maintained as a single mirror. With this configuration, a mechanical strength of the mirror element M1, M2 improved.

In the present embodiment, the second mirror 50 function as the input mirror 50 and the first mirror 30 functions as the output mirror 30 similar to the first embodiment. Then, at least the width D2 of the mirror element M2 of the input mirror 50 is set larger than seven times of the maximum value of the mid-wavelength infrared range. That is, the width D2 of the mirror element M2 of the input mirror 50 is set larger than 70 μm (D2>70 μm). Further, the width D2 of the mirror element M2 of the input mirror 50 may be set equal to or larger than ten times of the maximum value of the mid-wavelength infrared range. That is, the width D2 of the mirror element M2 of the input mirror 50 may be set equal to or larger than 100 μm (D2>=100 μm). Furthermore, the width D2 of the mirror element M2 of the input mirror 50 may be set equal to or larger than fifteen times of the maximum value of the mid-wavelength infrared range. That is, the width D2 of the mirror element M2 of the input mirror 50 may be set equal to or larger than 150 μm (D2>=150 μm). With this configuration, advantages similar to the first embodiment are provided by the Fabry-Perot interferometer 10 according to the present embodiment.

In the present embodiment, the transmission portion S2 of the input mirror 50 has only one mirror element M2. Thus, interference of light is restricted compared with a structure in which the input mirror 50 includes multiple mirror elements M2, each of which functions as a slit. By this configuration, the FWHM of the transmission light is reduced.

Further, the mirror element M1, M2 may include more than one supportive sections 32c, 52c. In the present embodiment, the supportive sections 32c, 52c is provided by a part of the second high-refractive layer 32, 52. Further, the supportive sections 32c, 52c may be provided by a separate component other than the part of the second high-refractive layer 32, 52.

Other Embodiments

In the present embodiment, the substrate 20 includes the semiconductor substrate 21 and the insulation film 22 arranged on a surface of the semiconductor substrate 21. Further, an insulated substrate, such as a glass substrate, may be employed as the substrate 20. When the substrate 20 is provided by the glass substrate, the insulation film 22 is not necessary.

In the present embodiment, the second mirror 50 is supported via the spacer 40 above the first mirror 30. Further, a part of the second mirror 50 that is arranged at an outer side than the second membrane MEM2 (bridge part 54) may be extended and contacted with the first mirror 30 in order to support the second membrane MEM2. In this configuration, the spacer 40 is not additionally necessary. In this structure, the spacer 40 is arranged on a part of the high-refractive layer 32 of the first mirror 30 corresponding to the second membrane MEM2. Then, the second mirror 50 is arranged such that the second mirror 50 covers the spacer 40. Then, the whole spacer 40 is removed by performing etching so that the gap AG is defined.

In the present embodiment, the distance between the mirror element M1 and the mirror element M2 is changed based on the electrostatic force generated between the electrodes 36, 56. Further, a piezoelectric effect may be used instead of the electrostatic force. For example, the distance between the mirror element M1 and the mirror element M2 may be changed by extending or contracting the spacer 40. Further, the mirrors 30, 50 may employ a structure that is deformable by heat, such as a bimorph structure, so that the distance between the mirror element M1 and the mirror element M2 is changed. Further, the distance between the mirror element M1 and the mirror element M2 may be changed by an electromagnetic force.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

What is claimed is:

1. A Fabry-Perot interferometer comprising:
   an input mirror arranged at an input side of a light; and
   an output mirror arranged at an output side of the light, the output mirror facing the input mirror in a first direction via a gap,
   wherein each of the input mirror and the output mirror includes a pair of high-refractive layers and a space layer arranged selectively between the pair of high-refractive layers, and each of the pair of high-refractive layers has a refractive index larger than a refractive index of the space layer,
   wherein, in the input mirror, the pair of high-refractive layers and the space layer provide an input-side bridge part that crosses the gap defined between the input mirror and the output mirror,
   wherein, in the output mirror, the pair of high-refractive-layers and the space layer provide an output-side bridge part that crosses the gap defined between the input mirror and the output mirror,
   wherein at least one of the input-side bridge part and the output-side bridge part is movable in the first direction as a membrane,
   wherein each of the input-side bridge part and the output-side bridge part includes a transmission portion and a periphery portion arranged around the transmission portion, and each of the transmission portions includes a mirror element in which the space layer is sandwiched by the pair of high-refractive layers,
   wherein the transmission portion of the input mirror is arranged facing the transmission portion of the output mirror,
   wherein the light output from the output mirror is referred to as a transmission light,
   wherein, in a second direction perpendicular to the first direction, the mirror element of the input mirror has a width larger than seven times of a maximum wavelength of the transmission light, and functions as a diffraction restriction mirror.

2. The Fabry-Perot interferometer according to claim 1, wherein the width of the diffraction restriction mirror in the second direction is equal to or larger than ten times of the maximum wavelength of the transmission light.

3. The Fabry-Perot interferometer according to claim 2, wherein the width of the diffraction restriction mirror in the second direction is equal to or larger than fifteen times of the maximum wavelength of the transmission light.

4. The Fabry-Perot interferometer according to claim 1, wherein the transmission portion of the input mirror includes only one mirror element.

5. The Fabry-Perot interferometer according to claim 4, further comprising
   a supportive section,
   wherein the pair of high-refractive layers of each of the input mirror and the output mirror includes a first high-refractive layer and a second high-refractive layer,
   wherein the second high-refractive layer includes a floating section that is located above the first high-refractive layer via the space layer, and
   wherein the supportive section is arranged on the first high-refractive layer and supports the floating section to be located above the first high-refractive layer.

6. The Fabry-Perot interferometer according to claim 5, wherein the supportive section is provided by the second high-refractive layer.

7. The Fabry-Perot interferometer according to claim 1, further comprising
   a supportive section,
   wherein the pair of high-refractive layers of each of the input mirror and the output mirror includes a first high-refractive layer and a second high-refractive layer,
   wherein the second high-refractive layer includes a floating section that is located above the first high-refractive layer via the space layer,
   wherein the supportive section is arranged on the first high-refractive layer and supports the floating section to be located above the first high-refractive layer, and
   wherein the transmission portion of the input mirror includes a plurality of the mirror elements that are divided by the supportive section.

8. The Fabry-Perot interferometer according to claim 7, wherein the supportive section is provided by the second high-refractive layer.

9. The Fabry-Perot interferometer according to claim 1, wherein, in the second direction, the width of the mirror element of the input mirror is larger than a width of the mirror element of the output mirror.

* * * * *